US012772237B2

(12) United States Patent
Chen et al.

(10) Patent No.: US 12,772,237 B2
(45) Date of Patent: Oct. 20, 2026

(54) METHOD AND APPARATUS FOR UPLINK TRANSMISSION ORDERING OF RADIO LINK CONTROL PROTOCOL DATA UNITS

(71) Applicant: Apogee 5G Global, LLC, Plano, TX (US)

(72) Inventors: Yu Chen, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 232 days.

(21) Appl. No.: 18/513,632

(22) Filed: Nov. 20, 2023

(65) Prior Publication Data

US 2024/0172221 A1 May 23, 2024

(30) Foreign Application Priority Data

Nov. 21, 2022 (CN) ......................... 202211453942.6

(51) Int. Cl.
*H04W 72/1268* (2023.01)
*H04W 72/543* (2023.01)
*H04W 72/566* (2023.01)

(52) U.S. Cl.
CPC ..... *H04W 72/1268* (2013.01); *H04W 72/543* (2023.01); *H04W 72/566* (2023.01)

(58) Field of Classification Search
CPC ........... H04W 72/1268; H04W 72/543; H04W 72/566
USPC .......................................................... 370/329
See application file for complete search history.

(56) References Cited

U.S. PATENT DOCUMENTS

2009/0323601 A1* 12/2009 Wu ..................... H04W 28/065 370/329
2019/0306871 A1* 10/2019 Liu ....................... H04W 28/06
2023/0224948 A1* 7/2023 Elazzouni ............. H04L 1/1825 370/329
2024/0155664 A1* 5/2024 Tsai ...................... H04W 72/56
(Continued)

OTHER PUBLICATIONS

Third Generation Partnership Project, “Technical Specification Group Services and System Aspects; Vocabulary for 3GPP Specifications (Release 17),” 3GPP TR 21.905 V17.1.0 (Dec. 2021).
(Continued)

*Primary Examiner* — Nicholas R Taylor
*Assistant Examiner* — Chong G Kim
(74) *Attorney, Agent, or Firm* — Volpe Koenig

(57) ABSTRACT

A method and device for wireless communications, comprising receiving a first signaling, and the first signaling indicating a first uplink grant; preferentially transmitting a latter of a first PDU and a second PDU on resources of the first uplink grant indicated by the first signaling; wherein both the first PDU and the second PDU are PDUs of RLC layer; the second PDU later than the first PDU available for a transmission of MAC layer; and the meaning of the phrase of preferentially transmitting a latter of a first PDU and a second PDU comprises: in an initial transmission of the first PDU and an initial transmission of the second PDU, prioritizing the initial transmission of the second PDU; the first PDU and the second PDU use a same logical channel. The present application facilitates a better transmission of a first PDU and a second PDU through a first signaling.

20 Claims, 6 Drawing Sheets

(56) References Cited

U.S. PATENT DOCUMENTS

2024/0267335 A1* 8/2024 Fu .................... H04W 72/1268
2025/0185001 A1* 6/2025 Rao .................... H04W 72/569

OTHER PUBLICATIONS

Third Generation Partnership Project, "Technical Specification Group Radio Access Network; NR; Multiplexing and channel coding (Release 17)," 3GPP TS 38.212 V17.3.0 (Sep. 2022).

Third Generation Partnership Project, "Technical Specification Group Radio Access Network; NR; Physical layer procedures for data (Release 17)," 3GPP TS 38.214 V17.3.0 (Sep. 2022).

Third Generation Partnership Project, "Technical Specification Group Radio Access Network; NR; NR and NG-RAN Overall Description; Stage 2 (Release 17)," 3GPP TS 38.300 V17.2.0 (Sep. 2022).

Third Generation Partnership Project, "Technical Specification Group Radio Access Network; NR; User Equipment (UE) procedures in Idle mode and RRC Inactive state (Release 17)," 3GPP TS 38.304 V17.2.0 (Sep. 2022).

Third Generation Partnership Project, "Technical Specification Group Radio Access Network; NR; Medium Access Control (MAC) protocol specification (Release 17)," 3GPP TS 38.321 V17.2.0 (Sep. 2022).

Third Generation Partnership Project, "Technical Specification Group Radio Access Network; NR; Radio Resource Control (RRC) protocol specification (Release 17)," 3GPP TS 38.331 V17.2.0 (Sep. 2022).

* cited by examiner

METHOD AND APPARATUS FOR UPLINK TRANSMISSION ORDERING OF RADIO LINK CONTROL PROTOCOL DATA UNITS

CROSS REFERENCE TO RELATED APPLICATIONS

This application claims the priority benefit of Chinese Patent Application No. 202211453942.6, filed on Nov. 21, 2022, the full disclosure of which is incorporated herein by reference.

BACKGROUND

Technical Field

The present application relates to transmission methods and devices in wireless communication systems, and in particular to a method and device for reducing service interruption, ensuring service quality of business, ensuring fairness, and improving resource utilization in communications.

Related Art

Application scenarios of future wireless communication systems are becoming increasingly diversified, and different application scenarios have different performance demands on systems. In order to meet different performance requirements of various application scenarios, 3rd Generation Partner Project (3GPP) Radio Access Network (RAN) #72 plenary decided to conduct the study of New Radio (NR), or what is called fifth Generation (5G). The work Item (WI) of NR was approved at 3GPP RAN #75 plenary to standardize the NR.

In communications, whether Long Term Evolution (LTE) or 5G NR involves features of accurate reception of reliable information, optimized energy efficiency ratio, determination of information efficiency, flexible resource allocation, scalable system structure, efficient non-access layer information processing, low service interruption and dropping rate and support for low power consumption, which are of great significance to the maintenance of normal communications between a base station and a UE, reasonable scheduling of resources and balancing of system payload. Those features can be called the cornerstone of high throughout and are characterized in meeting communication requirements of various service, improving spectrum utilization and improving service quality, which are indispensable in enhanced Mobile BroadBand (eMBB), Ultra Reliable Low Latency Communications (URLLC) and enhanced Machine Type Communications (eMTC). Meanwhile, in the following communication modes, covering Industrial Internet of Things (IIoT), Vehicular to X (V2X), Device to Device communications, Unlicensed Spectrum communications, User communication quality monitoring, network planning optimization, Non-Territorial Networks (NTN), Territorial Networks (TN), and Dual connectivity system, there are extensive requirements in radio resource management and selection of multi-antenna codebooks as well as in signaling design, adjacent cell management, service management and beamforming. Transmission methods of information are divided into broadcast transmission and unicast transmission, both of which are essential for 5G system for that they are very helpful to meet the above requirements. The UE can be connected to the network directly or through a relay.

With the increase of scenarios and complexity of systems, higher requirements are raised for interruption rate and time delay reduction, reliability and system stability enhancement, service flexibility and power saving. At the same time, compatibility between different versions of different systems should be considered when designing the systems.

Definitions and meanings of concepts, terms, and abbreviations in the present application can refer to 3GPP standard, including but not limited to:

https://www.3gpp.org/ftp/Specs/archive/21_series/21.905/21905-h10.zip https://www.3gpp.org/ftp/Specs/archive/38_series/38.300/38300-h10.zip https://www.3gpp.org/ftp/Specs/archive/38_series/38.331/38331-h10.zip https://www.3gpp.org/ftp/Specs/archive/38_series/38.321/38321-h10.zip https://www.3gpp.org/ftp/Specs/archive/38_series/38.304/38304-h10.zip

SUMMARY

In wireless communications, for limited resources, MAC layer is responsible for a selection of logical channels, that is, determining data of which logical channels can be transmitted, and in these selected logical channels, resources are further allocated based on certain policies, that is, certain resources are allocated to different logical channels. Obviously, different methods for selecting logical channels, as well as different methods for allocating resources will affect services, especially the fairness between different services and the utilization of resources. For a same logical channel, the prior art generally transmits data according to an arrival order, that is, data reaching MAC layer cache first will be transmitted preferentially, and data reaching MAC layer later will be transmitted later; on the other hand, a unit for measurement of a priority of data in the prior art is generally a logical channel, that is, priority of data within a logical channel is no longer distinguished, and if it needs to be distinguished, for example, in some systems, a priority of a signaling is higher than data, then the signaling can be configured to be transmitted on a logical channel with a higher priority. However, such an approach lacks the flexibility, resulting in difficulty in supporting finer control, further improving resource utilization, and satisfying data with different delay requirements, as well as having limits in the multiplexing of services. Therefore, one issue that needs to be addressed is the lack of flexibility when the MAC layer transmits data.

To address the above problem, the present application provides a solution.

It should be noted that if no conflict is incurred, embodiments in any node in the present application and the characteristics of the embodiments are also applicable to any other node, and vice versa. And the embodiments in the present application and the characteristics in the embodiments can be arbitrarily combined if there is no conflict. In addition, the method proposed in the present application can also solve other problems in communications.

The present application provides a method in a first node for wireless communications, comprising:

- receiving a first signaling, the first signaling indicating a first uplink grant; and
- preferentially transmitting a latter of a first PDU and a second PDU on resources of the first uplink grant indicated by the first signaling;

herein, both the first PDU and the second PDU are PDUs of RLC layer; the second PDU later than the first PDU available for a transmission of MAC layer; and the meaning of the phrase of preferentially transmitting a latter of a first PDU and a second PDU comprises: in an initial transmission of the first PDU and an initial transmission of the second PDU, prioritizing the initial transmission of the second PDU; the first PDU and the second PDU use a same logical channel.

In one embodiment, problems to be solved in the present application comprise: how to increase the flexibility of the MAC layer in resource allocation, logical channel selection, or data transmission, how to avoid limitations on transmission incurred by different arrival order at the MAC, how to optimize an initial transmission, how to control transmission of different data within a same logical channel more accurately, and how to ensure that different data can be processed differently when multiplexed onto a same logical channel; how to better support a transmission of an RLC PDU at the MAC layer, especially to ensure the service quality of a late arriving RLC PDU.

In one embodiment, advantages of the above method comprise: ensuring communication quality, avoiding service interruption, supporting richer services, improving user experience, supporting different types of measurements, supporting more flexible data transmission methods, supporting more flexible and finer processing of a logical channel, supporting different services to be multiplexed into a same logical channel and guaranteeing the quality requirements of each service, as well as improving the resource utilization.

Specifically, according to one aspect of the present application, both the first PDU and the second PDU are first-type PDUs, and multiple first-type PDUs carry one unit of information generated at the application level.

Specifically, according to one aspect of the present application, the first PDU carries one unit of information generated at the application level; the second PDU carries another unit of information generated at the application level.

Specifically, according to one aspect of the present application, the first PDU and the second PDU are both associated with a first delay budget, and the first delay budget is used to indicate delay requirements; the first PDU and the second PDU are used to carry a same unit of information generated at the application level.

Specifically, according to one aspect of the present application, both the first PDU and the second PDU are used to carry a same unit of information generated at the application level, and only a former of the first PDU and the second PDU is used to determine a priority of a PDU carrying a same unit of information generated at the application level.

Specifically, according to one aspect of the present application, only a former of the first PDU and the second PDU is used to determine a priority of the first logical channel or a volume of preferentially transmitted data of the first logical channel.

Specifically, according to one aspect of the present application, select at least first logical channel for the first uplink grant; allocate resources for data of each logical channel in the at least first logical channel; transmit at least one MAC PDU, and the at least one MAC PDU comprises the data of each logical channel in the at least first logical channel;

herein, the behavior of selecting at least first logical channel for the first uplink grant comprises: whether a logical channel is selected depends on whether data available for transmission of the logical channel comprises a first-type PDU; multiple first-type PDUs carry one unit of information generated at the application level; the first signaling is used to determine that the first uplink grant is applicable to a first-type PDU; the first logical channel is used to carry the first PDU and the second PDU.

Specifically, according to one aspect of the present application, the first node is an IoT terminal.

Specifically, according to one aspect of the present application, the first node is a mobile phone.

Specifically, according to one aspect of the present application, the first node is a helmet.

Specifically, according to one aspect of the present application, the first node is a vehicle terminal.

Specifically, according to one aspect of the present application, the first node is an aircraft.

Specifically, according to one aspect of the present application, the first node is a wearable device.

Specifically, according to one aspect of the present application, the first node is a relay.

The present application provides a method in a second node for wireless communications, comprising:

transmitting a first signaling, the first signaling indicating a first uplink grant;

herein, a latter of a first PDU and a second PDU is preferentially transmitted on resources of the first uplink grant indicated by the first signaling; both the first PDU and the second PDU are PDUs of RLC layer; the second PDU later than the first PDU available for a transmission of MAC layer; and the meaning of the phrase that a latter of a first PDU and a second PDU is preferentially transmitted on resources of the first uplink grant indicated by the first signaling comprises: in an initial transmission of the first PDU and an initial transmission of the second PDU, prioritizing the initial transmission of the second PDU; the first PDU and the second PDU use a same logical channel.

Specifically, according to one aspect of the present application, both the first PDU and the second PDU are first-type PDUs, and multiple first-type PDUs carry one unit of information generated at the application level.

Specifically, according to one aspect of the present application, the first PDU carries one unit of information generated at the application level; the second PDU carries another unit of information generated at the application level.

Specifically, according to one aspect of the present application, the first PDU and the second PDU are both associated with a first delay budget, and the first delay budget is used to indicate delay requirements; the first PDU and the second PDU are used to carry a same unit of information generated at the application level.

Specifically, according to one aspect of the present application, both the first PDU and the second PDU are used to carry a same unit of information generated at the application level, and only a former of the first PDU and the second PDU is used to determine a priority of a PDU carrying a same unit of information generated at the application level.

Specifically, according to one aspect of the present application, only a former of the first PDU and the second PDU is used to determine a priority of the first logical channel or a volume of preferentially transmitted data of the first logical channel.

Specifically, according to one aspect of the present application, receive at least one MAC PDU, and the at least one MAC PDU comprises data of at least first logical channel; the first logical channel is used to carry the first PDU and the second PDU.

Specifically, according to one aspect of the present application, the second node is a base station.

Specifically, according to one aspect of the present application, the second node is a cell or a cell group.

Specifically, according to one aspect of the present application, the second node is a gateway.

Specifically, according to one aspect of the present application, the second node is an access point.

The present application provides a first node for wireless communications, comprising:

a first receiver, receiving a first signaling, the first signaling indicating a first uplink grant; and a first transmitter, preferentially transmitting a latter of a first PDU and a second PDU on resources of the first uplink grant indicated by the first signaling;

herein, both the first PDU and the second PDU are PDUs of RLC layer; the second PDU later than the first PDU available for a transmission of MAC layer; and the meaning of the phrase of preferentially transmitting a latter of a first PDU and a second PDU comprises: in an initial transmission of the first PDU and an initial transmission of the second PDU, prioritizing the initial transmission of the second PDU; the first PDU and the second PDU use a same logical channel.

The present application provides a second node for wireless communications, comprising:

a second transmitter, transmitting a first signaling, the first signaling indicating a first uplink grant;

herein, a latter of a first PDU and a second PDU is preferentially transmitted on resources of the first uplink grant indicated by the first signaling; both the first PDU and the second PDU are PDUs of RLC layer; the second PDU later than the first PDU available for a transmission of MAC layer; and the meaning of the phrase that a latter of a first PDU and a second PDU is preferentially transmitted on resources of the first uplink grant indicated by the first signaling comprises: in an initial transmission of the first PDU and an initial transmission of the second PDU, prioritizing the initial transmission of the second PDU; the first PDU and the second PDU use a same logical channel.

In one embodiment, the present application has the following advantages over conventional schemes:

supporting more flexible data transmission;

supporting QoS control with smaller granularity;

supporting data with strict requirements on delay;

supporting that different data has different delay requirements;

supporting transmission of data based on a PDU set;

ensuring a priority of a set of data, such as a PDU set, so as to ensure that a PDU set can be completely transmitted;

better supporting XR services, ensuring quality of XR services and avoiding interruption of XR services during reception and transmission.

BRIEF DESCRIPTION OF THE DRAWINGS

Other features, objects and advantages of the present application will become more apparent from the detailed description of non-restrictive embodiments taken in conjunction with the following drawings.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
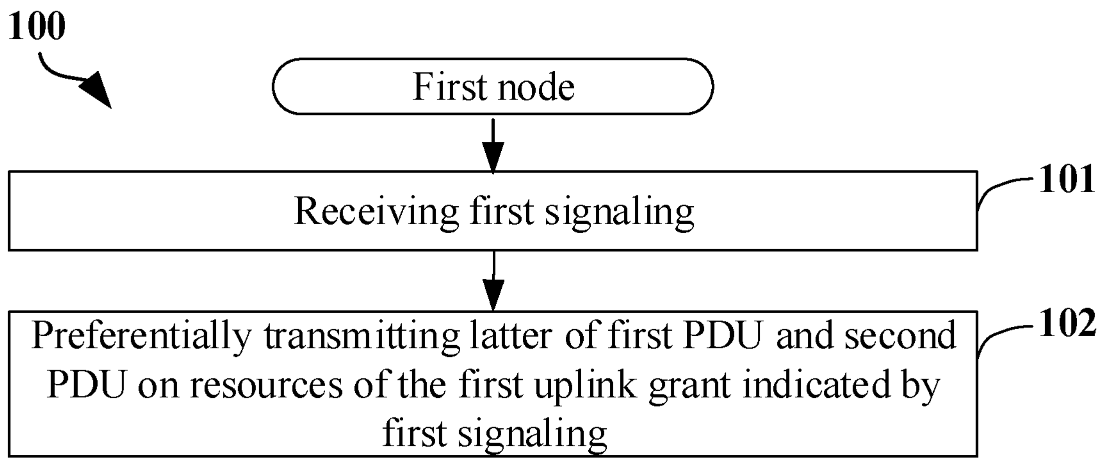
FIG. 1 illustrates a flowchart of receiving a first signaling and preferentially transmitting a latter of a first PDU and a second PDU on resources of the first uplink grant indicated by a first signaling according to one embodiment of the present application.

Embodiment 1 illustrates a flowchart of receiving a first signaling and preferentially transmitting a latter of a first PDU and a second PDU on resources of the first uplink grant indicated by a first signaling according to one embodiment of the present application, as shown in FIG. 1. In FIG. 1, each step represents a step, it should be particularly noted that the sequence order of each box herein does not imply a chronological order of steps marked respectively by these boxes.

In embodiment 1, the first node in the present application receives a first signaling in step 101, preferentially transmits a latter of a first PDU and a second PDU on resources of the first uplink grant indicated by a first signaling in step 102;

herein, the first signaling indicates a first uplink grant; both the first PDU and the second PDU are PDUs of RLC layer; the second PDU later than the first PDU available for a transmission of MAC layer; and the meaning of the phrase of preferentially transmitting a latter of a first PDU and a second PDU comprises: in an initial transmission of the first PDU and an initial transmission of the second PDU, prioritizing the initial transmission of the second PDU; the first PDU and the second PDU use a same logical channel.

In one embodiment, the first node is a User Equipment (UE).

In one embodiment, the first node is in RRC_CONNECTED state.

In one embodiment, the first node does not support multi-connectivity.

In one embodiment, the first node supports multi-connectivity.

In one embodiment, a serving cell refers to a UE-camped cell. Executing a cell search comprises: a UE searches for a suitable cell of a selected Public Land Mobile Network (PLMN) or a Stand-alone Non-Public Network (SNPN), selects the suitable cell to provide available traffic, and monitors a control channel of the suitable cell, and this procedure is defined as camping on a cell; that is to say, a camped cell is a serving cell of the UE relative to the UE. It has the following advantages to camp on a cell in RRC idle state or RRC inactive state: enabling the UE to receive a system message from a PLMN or an SNPN; after registration, if the UE wishes to establish an RRC connection or continue a suspended RRC connection, the UE can achieve this by executing an initial access on a control channel of the camping cell; the network may page the UE, which enables the UE to receive Earthquake and Tsunami Warning System (ETWS) and Commercial Mobile Alert System (CMAS) notifications.

In one embodiment, for a UE in RRC_CONNECTED state not configured with carrier aggregation/dual connectivity (CA/DC), only one serving cell comprises a primary cell. For a UE in RRC_CONNECTED state configured with carrier aggregation/dual connectivity (CA/DC), a serving cell is used to indicate a cell set comprising a Special Cell (SpCell) and all sub-cells. A Primary Cell is a Master Cell Group (MCG) cell, which works at primary frequency, and the UE executes an initial connection establishment procedure or initiates a connection re-establishment on a primary cell. For dual connectivity operation, a special cell refers to a Primary Cell (PCell) of an MCG or a Primary SCG Cell (PSCell) of an SCG; if it is not a dual connectivity operation, an SpCell refers to a PCell.

In one embodiment, frequency at which a Secondary Cell (SCell) works is sub-frequency.

In one embodiment, an individual content of an information element is called a field.

In one embodiment, Multi-Radio Dual Connectivity (MR-DC) refers to a dual connectivity between an E-UTRA and an NR node, or a dual connectivity between two NR nodes.

In one embodiment, in MR-DC, a radio access node providing a control-plane connection to the core network is a master node, and the master node may be a master eNB, a master ng-eNB, or a master gNB.

In one embodiment, an MCG refers to, in MR-DC, a group of serving cells associated with a master node, comprising an SpCell, and optionally one or multiple SCells.

In one embodiment, a PCell is an SpCell of an MCG.

In one embodiment, a PSCell is an SpCell of an SCG.

In one embodiment, in MR-DC, a control plane connection to the core network is not provided, and a radio access node providing extra resources to the UE is a sub-node. The sub-node can be an en-gNB, a sub-ng-eNB or a sub-gNB.

In one embodiment, in MR-DC, a group of serving cells associated with a sub-node is a Secondary Cell Group (SCG), comprising an SpCell and, optionally, one or multiple SCells.

In one embodiment, the first signaling is an RRC signaling.

In one embodiment, the first signaling comprises an RRC signaling.

In one embodiment, the first signaling is for a specific UE.

In one embodiment, the first signaling is transmitted by unicast.

In one embodiment, the first signaling is transmitted on SRB1.

In one embodiment, the first signaling is RRCReconfiguration.

In one embodiment, the first signaling is a MAC-layer control signaling.

In one embodiment, the first signaling is a MAC Control Element (CE).

In one embodiment, the first signaling is a physical-layer control signaling.

In one embodiment, the first signaling is Downlink control information (DCI).

In one embodiment, the first signaling indicates the first uplink grant.

In one embodiment, the first signaling does not indicate the first uplink grant.

In one embodiment, a signaling other than the first signaling indicates the first uplink grant.

In one embodiment, the first signaling indicates a period of the first uplink grant.

In one embodiment, the first signaling indicates resources of the first uplink grant.

In one embodiment, the first signaling indicates that the first uplink grant is activated.

In one embodiment, a second signaling indicates the first uplink grant.

In one subembodiment of the embodiment, the second signaling is a DCI.

In one embodiment, the uplink grant is allocating or scheduling resources for uplink transmission.

In one embodiment, the uplink grant is a configured grant (CG).

In one embodiment, the uplink grant is configured scheduling.

In one embodiment, the uplink grant is periodic.

In one embodiment, the first uplink grant is periodic.

In one embodiment, the first uplink grant is one of periodic uplink grants.

In one embodiment, the first uplink grant is an uplink grant within a subframe or a slot in a periodic uplink grant.

In one embodiment, a Radio Network Temporary Identifier (RNTI) comprised in or associated with or scrambled by the first uplink grant is a Configured Scheduling RNTI (CS-RNTI).

In one embodiment, an RNTI comprised in or associated with or scrambled by the first uplink grant is a Cell RNTI (C-RNTI).

In one embodiment, the first uplink grant comprises semi-persistent scheduling.

In one embodiment, the first uplink grant comprises dynamic scheduling.

In one embodiment, the first uplink grant comprises regular scheduling.

In one embodiment, the first uplink grant comprises uplink resources.

In one embodiment, the first uplink grant comprises at least one resource block.

In one embodiment, the first uplink grant comprises time resources and/or frequency resources.

In one embodiment, the first uplink grant comprises uplink channel resources.

In one embodiment, the first uplink grant comprises uplink spatial parameters or spatial resources.

In one embodiment, the first uplink grant is insufficient to transmit the first PDU and the second PDU.

In one embodiment, the first uplink grant is only sufficient to transmit either the first PDU or the second PDU.

In one embodiment, the first uplink grant is only sufficient to transmit a part of the first PDU or the second PDU.

In one embodiment, the first PDU cannot be segmented.

In one embodiment, the first PDU cannot be further segmented.

In one embodiment, the second PDU can be segmented or re-segmented.

In one embodiment, MAC layer or MAC sublayer provides data transmission services on a logical channel.

In one embodiment, in order to accommodate different types of data transmission services, multiple types of logical channels can be defined, that is, each one supports a transmission of a specific type of information.

In one embodiment, each logical channel type is defined as transmitting which information.

In one embodiment, sublayers above the MAC sublayer transmit data through a logical channel of the MAC sublayer.

In one embodiment, the meaning of the phrase of preferentially transmitting a latter of a first PDU and a second PDU on resources of the first uplink grant indicated by the first signaling comprises: the first PDU is transmitted on resources of the first uplink grant.

In one embodiment, the meaning of the phrase of preferentially transmitting a latter of a first PDU and a second PDU on resources of the first uplink grant indicated by the first signaling comprises: the second PDU is transmitted on resources of the first uplink grant.

In one embodiment, the meaning of the phrase of preferentially transmitting a latter of a first PDU and a second PDU on resources of the first uplink grant indicated by the first signaling comprises: the first PDU is not transmitted, and the second PDU is transmitted on resources of the first uplink grant.

In one embodiment, the meaning of the phrase of preferentially transmitting a latter of a first PDU and a second PDU on resources of the first uplink grant indicated by the first signaling comprises: the first PDU is transmitted on resources of the first uplink grant; the second PDU is transmitted on resources of the first uplink grant.

In one embodiment, the meaning of the phrase of preferentially transmitting a latter of a first PDU and a second PDU on resources of the first uplink grant indicated by the first signaling comprises: a part of the first PDU is transmitted on resources of the first uplink grant; the second PDU is transmitted on resources of the first uplink grant.

In one embodiment, the meaning of the phrase of preferentially transmitting a latter of a first PDU and a second PDU on resources of the first uplink grant indicated by the first signaling comprises: upon a transmission of the first PDU, the second PDU must be transmitted.

In one embodiment, the meaning of the phrase of preferentially transmitting a latter of a first PDU and a second PDU on resources of the first uplink grant indicated by the first signaling comprises: when resources of the first uplink grant can only transmit one of the first PDU and the second PUD, the second PDU is transmitted.

In one embodiment, the meaning of the phrase of preferentially transmitting a latter of a first PDU and a second PDU on resources of the first uplink grant indicated by the first signaling comprises: the first PDU is transmitted only when the second PDU is transmitted.

In one embodiment, the meaning of the phrase of preferentially transmitting a latter of a first PDU and a second PDU on resources of the first uplink grant indicated by the first signaling comprises: the first PDU is only allocated resources of the first uplink grant if the second PDU is allocated resources of the first uplink grant.

In one embodiment, the meaning of the phrase of preferentially transmitting a latter of a first PDU and a second PDU on resources of the first uplink grant indicated by the first signaling comprises: a part of the second PDU is transmitted on resources of the first uplink grant.

In one subembodiment of the embodiment, the first PDU is not transmitted on resources of the first uplink grant.

In one embodiment, the meaning of a PDU of an RLC layer is equal to a PDU of an RLC sublayer.

In one embodiment, both the first PDU and the second PDU are data.

In one embodiment, both the first PDU and the second PDU are information used to bear a DRB.

In one embodiment, both the first PDU and the second PDU are used to bear NAS services.

In one embodiment, the first PDU and the second PDU are generated by a same RLC entity.

In one embodiment, the first PDU and the second PDU are generated by different RLC entities.

In one embodiment, the first PDU and the second PDU are generated by a same PDCP entity.

In one embodiment, the first PDU and the second PDU are generated by different PDCP entities.

In one embodiment, the first PDU and the second PDU belong to a same QoS flow.

In one embodiment, the first PDU and the second PDU belong to different QoS flows.

In one embodiment, the first PDU and the second PDU belong to different QoS sub-flows.

In one embodiment, the first PDU and the second PDU belong to a same PDU set.

In one embodiment, the first PDU and the second PDU belong to different PDU sets.

In one embodiment, the first PDU and the second PDU carry a same PDU set.

In one embodiment, the first PDU and the second PDU carry different PDU sets.

In one embodiment, both the first PDU and the second PDU are MAC service data units (SDUs).

In one embodiment, the meaning of the phrase that the second PDU later than the first PDU available for a transmission of MAC layer comprises: a sequence number of the second PDU is a sequence number after a sequence number of the first PDU.

In one embodiment, the meaning of the phrase that the second PDU later than the first PDU available for a transmission of MAC layer comprises: the second PDU arrives at MAC layer later than the first PDU.

In one embodiment, the meaning of the phrase that the second PDU later than the first PDU available for a transmission of MAC layer comprises: the second PDU arrives at cache of MAC layer later than the first PDU.

In one embodiment, the meaning of the phrase that the second PDU later than the first PDU available for a transmission of MAC layer comprises: a part of the first PDU earlier than the second PDU can be transmitted.

In one embodiment, the meaning of the phrase that the second PDU later than the first PDU available for a transmission of MAC layer comprises: when the second PDU does not arrive at MAC layer, the first PDU has already arrived at MAC layer.

In one embodiment, the meaning of the phrase that the second PDU later than the first PDU available for a transmission of MAC layer comprises: the first PDU is ranked before the second PDU in cache of MAC.

In one embodiment, the meaning of the phrase that the second PDU later than the first PDU available for a transmission of MAC layer comprises: the first PDU is ranked before the second PDU in cache of Hybrid Automatic Repeat reQuest (HARQ).

In one embodiment, the meaning of the phrase that the second PDU later than the first PDU available for a transmission of MAC layer comprises: the first PDU earlier than the second PDU can be used for a transmission of MAC layer.

In one embodiment, the meaning of the phrase of an initial transmission of the first PDU is: a first transmission of the first PDU.

In one embodiment, the meaning of the phrase of an initial transmission of the second PDU is: a first transmission of the second PDU.

In one embodiment, the first signaling indicates that the first uplink grant is an initial transmission for a HARQ process number transmitting the second PDU.

In one embodiment, the first uplink grant is an initial transmission for a HARQ process number transmitting the second PDU.

In one embodiment, the first uplink grant is an initial transmission for a HARQ process number transmitting the first PDU.

In one embodiment, the meaning of the phrase of prioritizing an initial transmission of the second PDU comprises: when both the first PDU and the second PDU are initial transmission, only when an initial transmission of the second PDU is executed, an initial transmission of the first PDU is executed.

In one embodiment, the meaning of the phrase of prioritizing an initial transmission of the second PDU comprises: when both the first PDU and the second PDU are initial transmission, only when an initial transmission of the second PDU is allocated resources, an initial transmission of the first PDU is allocated resources.

In one embodiment, the meaning of the phrase of prioritizing an initial transmission of the second PDU comprises: when both the first PDU and the second PDU are initial transmission, and resources of the first uplink grant are insufficient to transmit the first PDU and the second PDU, the second PDU is transmitted.

In one embodiment, resources of the first uplink grant at least can transmit the second PDU.

In one embodiment, the meaning of the phrase that the first PDU and the second PDU use a same logical channel comprises: the first PDU and the second PDU are transmitted on a same logical channel.

In one embodiment, the meaning of the phrase that the first PDU and the second PDU use a same logical channel comprises: the first PDU and the second PDU occupy a same logical channel.

In one embodiment, the meaning of the phrase that the first PDU and the second PDU use a same logical channel comprises: logical channel numbers of the first PDU and the second PDU are the same.

In one embodiment, the first uplink grant is for XR services.

In one embodiment, the first uplink grant is for a PDU set.

In one embodiment, the first uplink grant is for a first-type PDU.

In one embodiment, the first uplink grant is applicable to a first-type PDU.

In one embodiment, the first uplink grant is only applicable to a first-type PDU.

In one embodiment, the first PDU and the second PDU have a same priority.

In one embodiment, a priority of the first PDU is greater than a priority of the second PDU.

In one embodiment, a priority of the first PDU is not lower than a priority of the second PDU.

In one embodiment, a priority of the first PDU is different from a priority of the second PDU.

In one embodiment, the first PDU and the second PDU carry different PDU sets.

In one embodiment, the first PDU and the second PDU carry a same PDU set.

In one embodiment, the first PDU and the second PDU carry different information measured in one unit generated at the application level.

In one embodiment, the first PDU and the second PDU respectively carry different services.

In one embodiment, the second PDU is used to transmit data of XR services.

In one embodiment, the first PDU is used to transmit data of services other than XR.

In one embodiment, both the first PDU and the second PDU are first-type PDUs.

In one embodiment, the first PDU is not a first-type PDU.

In one embodiment, the second PDU is a first-type PDU.

In one embodiment, the first PDU and the second PDU are associated with different delay budgets.

In one embodiment, a remaining processing time of the first PDU is different from a remaining processing time of the second PDU.

In one embodiment, a remaining processing time of the first PDU is same as a remaining processing time of the second PDU.

In one embodiment, a remaining processing time of the first PDU is longer than a remaining processing time of the second PDU.

In one embodiment, a delay budget of the first PDU is longer than a remaining delay budget of the second PDU.

In one embodiment, the first-type PDU is a PDU generated by a same protocol layer.

In one embodiment, the first-type PDU is a PDU generated by a radio access network protocol layer.

Figure 3:
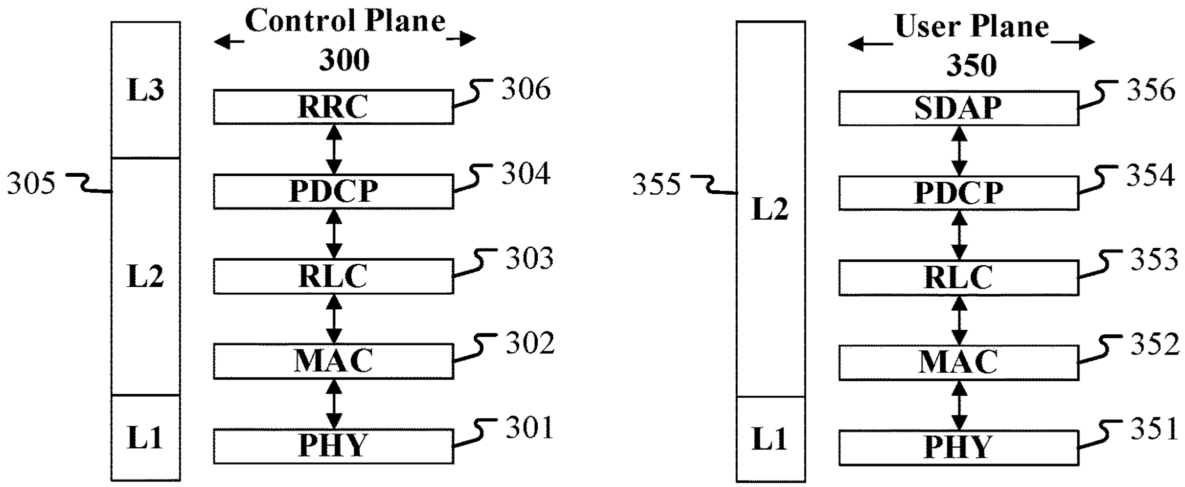
FIG. 3 illustrates a schematic diagram of a radio protocol architecture of a user plane and a control plane according to one embodiment of the present application.

In one embodiment, the first-type PDU is a PDU generated by a protocol layer in FIG. 3.

In one embodiment, the first-type PDU is a PDU of an RLC layer or RLC sublayer.

In one embodiment, the first-type PDU is an RLC PDU.

In one embodiment, the first-type PDU is a PDU carrying a same service.

In one embodiment, the first-type PDU is a PDU carrying XR services.

In one embodiment, the first-type PDU is a PDU from a same QoS flow.

In one embodiment, the first-type PDU is associated with a same service identifier.

In one embodiment, the first-type PDU belongs to a same session.

In one embodiment, the first-type PDU belongs to or uses a same radio bearer.

In one embodiment, the first-type PDU belongs to a same service.

In one embodiment, the first-type PDU belongs to a same XR service.

In one embodiment, the first-type PDU belongs to a same PDU set.

In one embodiment, the one unit of information generated at the application level is a PDU set.

In one embodiment, the one unit of information generated at the application level is information with dependence relation.

In one embodiment, the one unit of information generated at the application level is information required to be processed as a whole during processing.

In one embodiment, the one unit of information generated at the application level is information requires to be processed together.

In one embodiment, the one unit of information generated at the application level is information generated at the application level requires to be dropped as a whole upon being dropped.

In one embodiment, the one unit of information generated at the application level is that when any PDU requires to be dropped, all the one unit of information generated at the application level must be dropped.

In one embodiment, the one unit of information generated at the application level is information of XR services.

In one embodiment, the one unit of information generated at the application level is a group of pictures (GoP).

In one embodiment, the one unit of information generated at the application level is carried by multiple first-type PDUs.

In one embodiment, the one unit of information generated at the application level is carried by the first-type PDU.

In one embodiment, the first-type PDU has a same QoS requirement.

In one embodiment, the first-type PDU has a same delay requirement.

In one embodiment, the first-type PDU has a same latency budget or delay budget.

In one embodiment, there is an interdependence relation between PDU(s) of the first-type PDU(s).

In one embodiment, PDUs of the first-type PDU belong to a same PDU set.

In one embodiment, PDUs of the first-type PDU is or carry a same PDU set.

In one embodiment, all the first-type PDUs belong to a same data burst.

In one embodiment, the first-type PDU belongs to a same or different logical channels.

In one embodiment, the first-type PDU belongs to a same or different radio bearers.

In one embodiment, the first-type PDU is generated by a same or different PDCP entities.

In one embodiment, the first-type PDU is generated by a same or different RLC entities.

In one embodiment, the first PDU and the second PDU use a first logical channel.

In one embodiment, the first PDU and the second PDU only use a first logical channel.

In one embodiment, the first PDU uses a first logical channel and a logical channel other than the first logical channel.

In one embodiment, the second PDU uses a first logical channel and a logical channel other than the first logical channel.

In one embodiment, the first PDU uses a first logical channel and a second logical channel.

In one embodiment, the second PDU uses a first logical channel.

In one subembodiment of the above embodiment, the second PDU uses a second logical channel.

In one subembodiment of the above embodiment, the second PDU does not use a second logical channel.

In one subembodiment of the above embodiment, the second PDU uses a third logical channel.

In one embodiment, the first logical channel is any logical channel used for transmitting data.

In one embodiment, the first logical channel is one or any downlink traffic channel (DTCH).

In one embodiment, the first logical channel is a logical channel where data available for transmission comprises the first-type PDU.

In one embodiment, the first logical channel is a logical channel used to bear XR services.

In one embodiment, the first logical channel is used to transmit data of data radio bearer (DRB).

In one embodiment, the first logical channel is used to transmit data of an RB other than a DRB, a signaling radio bearer (SRB), and a multicast broadcast service radio bearer (MRB).

In one embodiment, both the first PDU and the second PDU are first-type PDUs, and multiple first-type PDUs carry one unit of information generated at the application level.

In one embodiment, the first PDU is a first-type PDU, the second PDU is a second-type PDU, and multiple first-type PDUs carry one unit of information generated at the application level; multiple second-type PDUs carry one unit of information generated at the application level.

In one embodiment, the first-type PDU carries one unit of information generated at the application level; the second PDU carries another unit of information generated at the application level.

In one subembodiment of the embodiment, the first PDU is used to carry information of a first PDU set.

In one subembodiment of the embodiment, the second PDU is used to carry information of a second PDU set.

In one subembodiment of the embodiment, the another unit of information generated at the application level is another PDU set.

In one embodiment, the first PDU and the second PDU are both associated with a first delay budget, and the first delay budget is used to indicate delay requirements; the first PDU and the second PDU are used to carry a same unit of information generated at the application level.

In one subembodiment of the embodiment, both the first PDU and the second PDU belong to a first-type PDU.

In one subembodiment of the embodiment, both the first PDU and the second PDU are used to carry a same PDU set.

In one embodiment, the first delay budget is a delay budget of the first PDU.

In one embodiment, the first delay budget is a delay budget of the second PDU.

In one embodiment, the first delay budget is a packet delay budget (PDB).

In one embodiment, the first delay budget is a PDU set delay budget (PSDB).

In one embodiment, the first delay budget represents a maximum delay requirement.

In one embodiment, the first delay budget represents a remaining processing time.

In one embodiment, the first delay budget represents a time before reaching a receiving end.

In one embodiment, a delay budget of a first-type PDU is determined by QoS of the first-type PDU.

In one embodiment, a delay budget of a first-type PDU is determined by QoS of services carried by the first-type PDU.

In one embodiment, a delay budget for a first-type PDU is fixed.

In one embodiment, a delay budget of a first-type PDU decreases over time.

In one embodiment, when a value of the delay budget of the first-type PDU decreases to 0, the first-type PDU is dropped.

In one embodiment, when a value of the delay budget of the first-type PDU decreases to a specific threshold, the first-type PDU is dropped.

In one embodiment, the delay budget of the first-type PDU is for multiple the first-type PDUs.

In one embodiment, the delay budget of the first-type PDU is for a PDU set.

In one embodiment, both the first PDU and the second PDU are used to carry a same unit of information generated at the application level, and only a former of the first PDU and the second PDU is used to determine a priority of a PDU carrying a same unit of information generated at the application level.

In one subembodiment of the embodiment, the first PDU and the second PDU carry data of a same PDU set.

In one embodiment, the behavior of, selecting at least first logical channel for the first uplink grant, comprises: whether a logical channel is selected depends on Bj of the logical channel.

In one embodiment, the data of each logical channel in the at least first logical channel is a new transmission.

In one embodiment, the at least one MAC PDU is a new transmission.

In one embodiment, the at least one MAC PDU does not comprise a retransmission.

In one embodiment, Bj of each logical channel in the at least first logical channel is greater than 0.

In one embodiment, Bj of any logical channel j in the at least first logical channel is greater than 0.

In one embodiment, the Bj is maintained by any logical channel j.

In one embodiment, the Bj is maintained by each logical channel j.

In one embodiment, each logical channel maintains a Bj.

In one embodiment, the first logical channel is logical channel j.

In one embodiment, j is an integer or a non-negative integer.

In one embodiment, j is a positive integer.

In one embodiment, the logical channel is logical channel j.

In one embodiment, the Bj is a parameter used for logical channel prioritization (LCP).

In one embodiment, when a logical channel is established, a MAC entity initializes Bj of the logical channel as 0.

In one embodiment, for any logical channel j, during each LCP, a MAC entity increases Bj by PBR×T, where T is a time elapsed since Bj was last increased, and Prioritized Bit Rate (PBR) is a prioritized data rate.

In one embodiment, a PRB of any logical channel is indicated by the network.

In one embodiment, a PRB of any logical channel is indicated by the first signaling.

In one embodiment, when a value of Bj is greater than a size of a bucket, Bj is set to the size of the bucket, where the size of the bucket is equal to PBR×BSD, where a Bucket Size Duration (BSD) is configured by the network.

In one embodiment, for a new transmission, a MAC entity is allocated resources according to the following method: for logical channels whose Bj is greater than 0, allocating resources for the first uplink grant according to a descending order of priority.

In one embodiment, if a PBR of a logical channel in the at least first logical channel is infinite, then only after all data of this logical channel is allocated resources, a logical channel with lower priority is considered.

In one embodiment, Bj of any logical channel j is decreased by a sum of all the transmitted MAC service data units (SDU) of data of the logical channel j.

In one embodiment, the phrase of the behavior of, selecting at least first logical channel for the first uplink grant, comprises: the meaning of whether a logical channel is selected depends on Bj of the logical channel comprises: under the condition that parameters other than Bj of the logical channel are the same, data available for transmission of a logical channel with larger Bj is preferentially transmitted.

In one embodiment, the phrase of the behavior of, selecting at least first logical channel for the first uplink grant, comprises: the meaning of whether a logical channel is selected depends on Bj of the logical channel comprises: under the condition that parameters other than the Bj of the logical channel are the same, data available for transmission of the logical channel with smaller Bj is preferentially transmitted.

In one embodiment, the first PDU and the second PDU are respectively associated with different QoS parameters.

In one embodiment, the first PDU and the second PDU are respectively associated with different radio bearers.

In one embodiment, the first PDU and the second PDU are respectively associated with different QoS flows or QoS sub-flows.

In one embodiment, both the first PDU and the second PDU are data PDUs.

Embodiment 2

Figure 2:
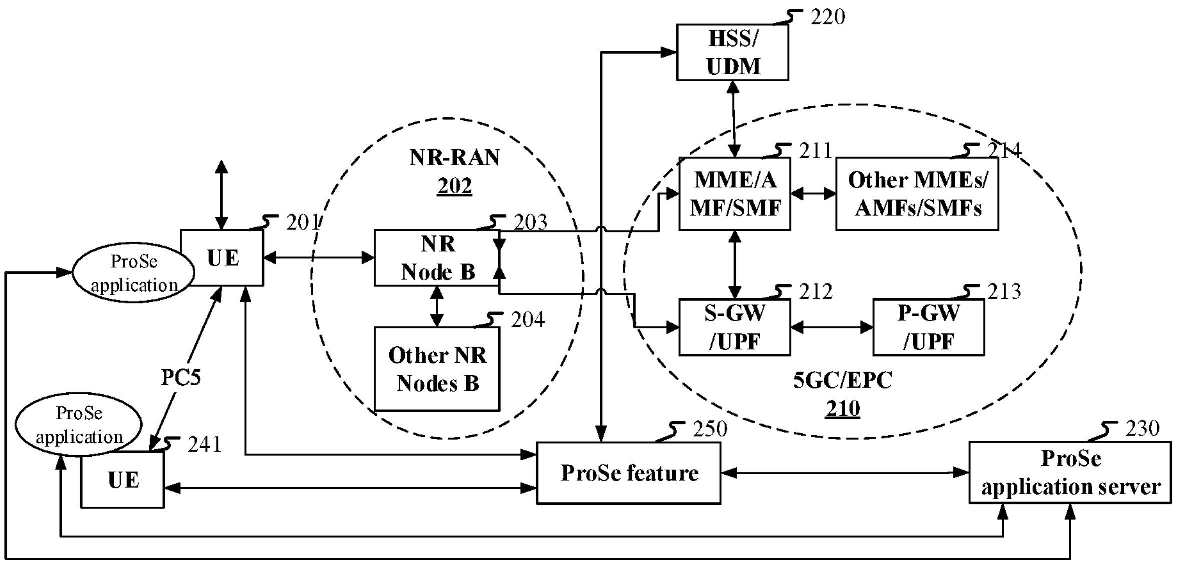
FIG. 2 illustrates a schematic diagram of a network architecture according to one embodiment of the present application.

Embodiment 2 illustrates a schematic diagram of a network architecture according to the present application, as shown in FIG. 2.

FIG. 2 illustrates a network architecture 200 of 5G NR, Long-Term Evolution (LTE) and Long-Term Evolution Advanced (LTE-A) systems. The 5G NR or LTE network architecture 200 may be called a 5G System (5GS)/Evolved Packet System (EPS) 200 or other appropriate terms. The 5GS/EPS 200 may comprise one or more UEs 201, an NG-RAN 202, a 5G Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present application can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called abase station, abase transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an Sl/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the first node in the present application is a UE 201.

In one embodiment, the second node in the present application is a gNB 203.

In one embodiment, a radio link between the UE 201 and NR node B is uplink.

In one embodiment, a radio link between NR node B and the UE 201 is downlink.

In one embodiment, the UE 201 supports relay transmission.

In one embodiment, the UE 201 comprises a mobile phone.

In one embodiment, the UE 201 is a vehicle comprising a car.

In one embodiment, the UE 201 supports multiple SIM cards.

In one embodiment, the UE 201 supports sidelink transmission.

In one embodiment, the UE 201 supports multimedia transmission.

In one embodiment, the UE 201 supports broadcast and multicast transmission.

In one embodiment, the gNB 203 is a MarcoCellular base station.

In one embodiment, the gNB 203 is a Micro Cell base station.

In one embodiment, the gNB 203 is a PicoCell base station.

In one embodiment, the gNB 203 is a flight platform.

In one embodiment, the gNB 203 is satellite equipment.

Embodiment 3

Embodiment 3 illustrates a schematic diagram of an example of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for a first node (UE, gNB or a satellite or an aircraft in NTN) and a second node (gNB, UE or a satellite or an aircraft in NTN), or between two UEs is represented by three layers, which are a layer 1, a layer 2 and a layer 3, respectively. The layer 1 (L1) is the lowest layer and performs signal processing functions of various PHY layers. The L1 is called PHY 301 in the present application. The layer 2 (L2) 305 is above the PHY 301, and is in charge of a link between a first node and a second node, as well as two UEs via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second node. The PDCP sublayer 304 provides multiplexing among variable radio bearers and logical channels. The PDCP sublayer 304 provides security by encrypting a packet and provides support for a first node handover between second nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second node and a first node. PC5 Signaling Protocol (PC5-S) sublayer 307 is responsible for the processing of signaling protocol at PC5 interface. The radio protocol architecture of the user plane 350 comprises layer 1 (L1) and layer 2 (L2). In the user plane 350, the radio protocol architecture for the first node and the second node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in the figure, the first node may comprise several higher layers above the L2 305. also comprises a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first signaling in the present application is generated by the RRC 306.

In one embodiment, the second signaling in the present application is generated by the PHY 301.

In one embodiment, the at least one MAC PDU in the present application is generated by the MAC 302 or the MAC 352.

In one embodiment, the first PDU in the present application is generated by the RLC 353.

In one embodiment, the second PDU in the present application is generated by the RLC 353.

Embodiment 4

Figure 4:
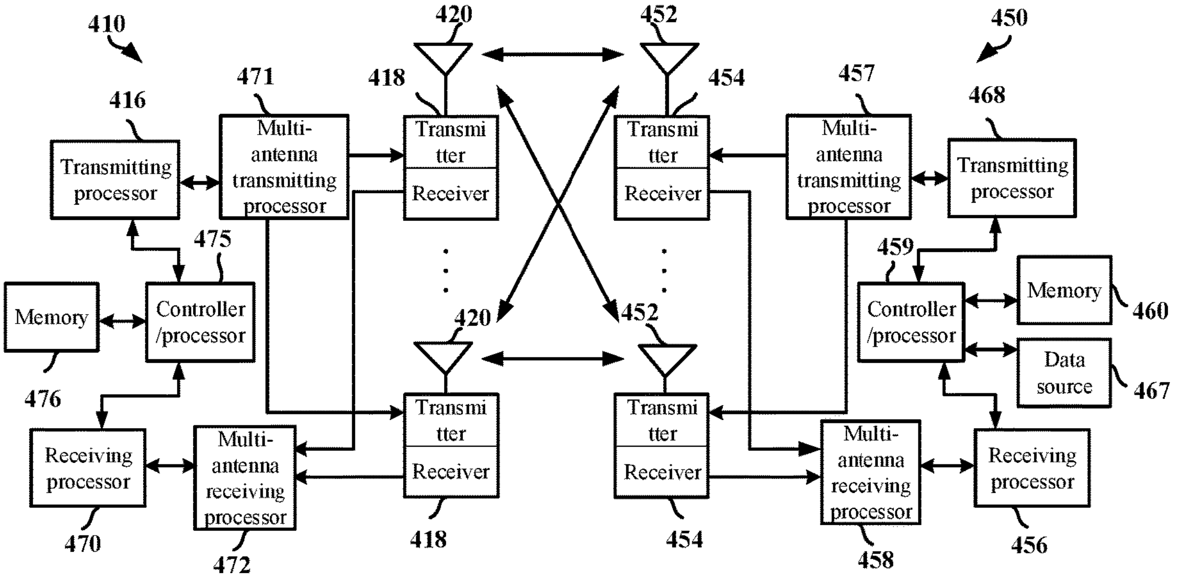
FIG. 4 illustrates a schematic diagram of a first communication device and a second communication device according to one embodiment of the present application.

Embodiment 4 illustrates a schematic diagram of a first communication device and a second communication device according to one embodiment of the present application, as shown in FIG. 4. FIG. 4 is a block diagram of a first communication device 450 in communication with a second communication device 410 in an access network.

The first communication device 450 comprises a controller/processor 459, a memory 460, a data source 467, a transmitting processor 468, a receiving processor 456, optionally may also comprise a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, optional can also comprise a multi-antenna receiving processor 472, a multi-antenna transmitting processor 471, a transmitter/receiver 418 and an antenna 420.

In a transmission from the second communication device 410 to the first communication device 450, at the first communication device 410, a higher layer packet from the core network is provided to a controller/processor 475. The controller/processor 475 provides a function of the L2 layer. In the transmission from the second communication device 410 to the first communication device 450, the controller/processor 475 provides header compression, encryption, packet segmentation and reordering, and multiplexing between a logical channel and a transport channel, and radio resources allocation for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multi-carrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first communication device 450 comprises: at least one processor and at least one memory. The at least one memory comprises computer program codes; the at least one memory and the computer program codes are configured to be used in collaboration with the at least one processor, the first communication device 450 at least: receives a first signaling, the first signaling indicates a first uplink grant; preferentially transmits a latter of a first PDU and a second PDU on resources of the first uplink grant indicated by the first signaling; herein, both the first PDU and the second PDU are PDUs of RLC layer; the second PDU later than the first PDU available for a transmission of MAC layer; and the meaning of the phrase of preferentially transmitting a latter of a first PDU and a second PDU comprises: in an initial transmission of the first PDU and an initial transmission of the second PDU, prioritizing the initial transmission of the second PDU; the first PDU and the second PDU use a same logical channel.

In one embodiment, the first communication device 450 comprises at least one processor and at least one memory. a memory that stores a computer readable instruction program. The computer readable instruction program generates an action when executed by at least one processor. The action includes: receiving a first signaling, the first signaling indicating a first uplink grant; preferentially transmitting a latter of a first PDU and a second PDU on resources of the first uplink grant indicated by the first signaling; herein, both the first PDU and the second PDU are PDUs of RLC layer; the second PDU later than the first PDU available for a transmission of MAC layer; and the meaning of the phrase of preferentially transmitting a latter of a first PDU and a second PDU comprises: in an initial transmission of the first PDU and an initial transmission of the second PDU, prioritizing the initial transmission of the second PDU; the first PDU and the second PDU use a same logical channel.

In one embodiment, the second communication device 410 comprises at least one processor and at least one memory. The at least one memory comprises computer program codes; the at least one memory and the computer program codes are configured to be used in collaboration with the at least one processor. The second communication device 410 at least: transmits a second signaling, the first signaling indicates a first uplink grant; herein, a latter of a first PDU and a second PDU is preferentially transmitted on resources of the first uplink grant indicated by the first signaling; both the first PDU and the second PDU are PDUs of RLC layer; the second PDU later than the first PDU available for a transmission of MAC layer; and the meaning of the phrase that a latter of a first PDU and a second PDU is preferentially transmitted on resources of the first uplink grant indicated by the first signaling comprises: in an initial transmission of the first PDU and an initial transmission of the second PDU, prioritizing the initial transmission of the second PDU; the first PDU and the second PDU use a same logical channel.

In one embodiment, the second communication device 410 comprises a memory that stores a computer readable instruction program. The computer readable instruction program generates an action when executed by at least one processor. The action includes: transmitting a second signaling, the first signaling indicating a first uplink grant; herein, a latter of a first PDU and a second PDU is preferentially transmitted on resources of the first uplink grant indicated by the first signaling; both the first PDU and the second PDU are PDUs of RLC layer; the second PDU later than the first PDU available for a transmission of MAC layer; and the meaning of the phrase that a latter of a first PDU and a second PDU is preferentially transmitted on resources of the first uplink grant indicated by the first signaling comprises: in an initial transmission of the first PDU and an initial transmission of the second PDU, prioritizing the initial transmission of the second PDU; the first PDU and the second PDU use a same logical channel.

In one embodiment, the first communication device 450 corresponds to a first node in the present application.

In one embodiment, the second communication device 410 corresponds to a second node in the present application.

In one embodiment, the first communication device 450 is a UE.

In one embodiment, the first communication device 450 is a vehicle terminal.

In one embodiment, the second communication device 450 is a relay.

In one embodiment, the second communication device 450 is a satellite.

In one embodiment, the second communication device 450 is an aircraft.

In one embodiment, the second communication device 410 is a base station.

In one embodiment, the second communication device 410 is a relay.

In one embodiment, the second communication device 410 is a UE.

In one embodiment, the second communication device 410 is a satellite.

In one embodiment, the second communication device 410 is an aircraft.

In one embodiment, the receiver 454 (comprising the antenna 452), the receiving processor 456 and the controller/processor 459 are used to receive the first signaling in the present application.

In one embodiment, the receiver 454 (comprising the antenna 452), the receiving processor 456 and the controller/processor 459 are used to receive the second signaling in the present application.

In one embodiment, the transmitter 454 (comprising antenna 452), the transmitting processor 468 and the controller/processor 459 are used to transmit at least one MAC PDU in the present application.

In one embodiment, the transmitter 418 (comprising the antenna 420), the transmitting processor 416 and the controller/processor 475 are used to transmit the first signaling in the present application.

In one embodiment, the transmitter 418 (comprising the antenna 420), the transmitting processor 416 and the controller/processor 475 are used to transmit the second signaling in the present application.

In one embodiment, the receiver 418 (comprising the antenna 420), the receiving processor 470 and the controller/processor 475 are used to receive the at least one MAC PDU in the present application.

Embodiment 5

Figure 5:
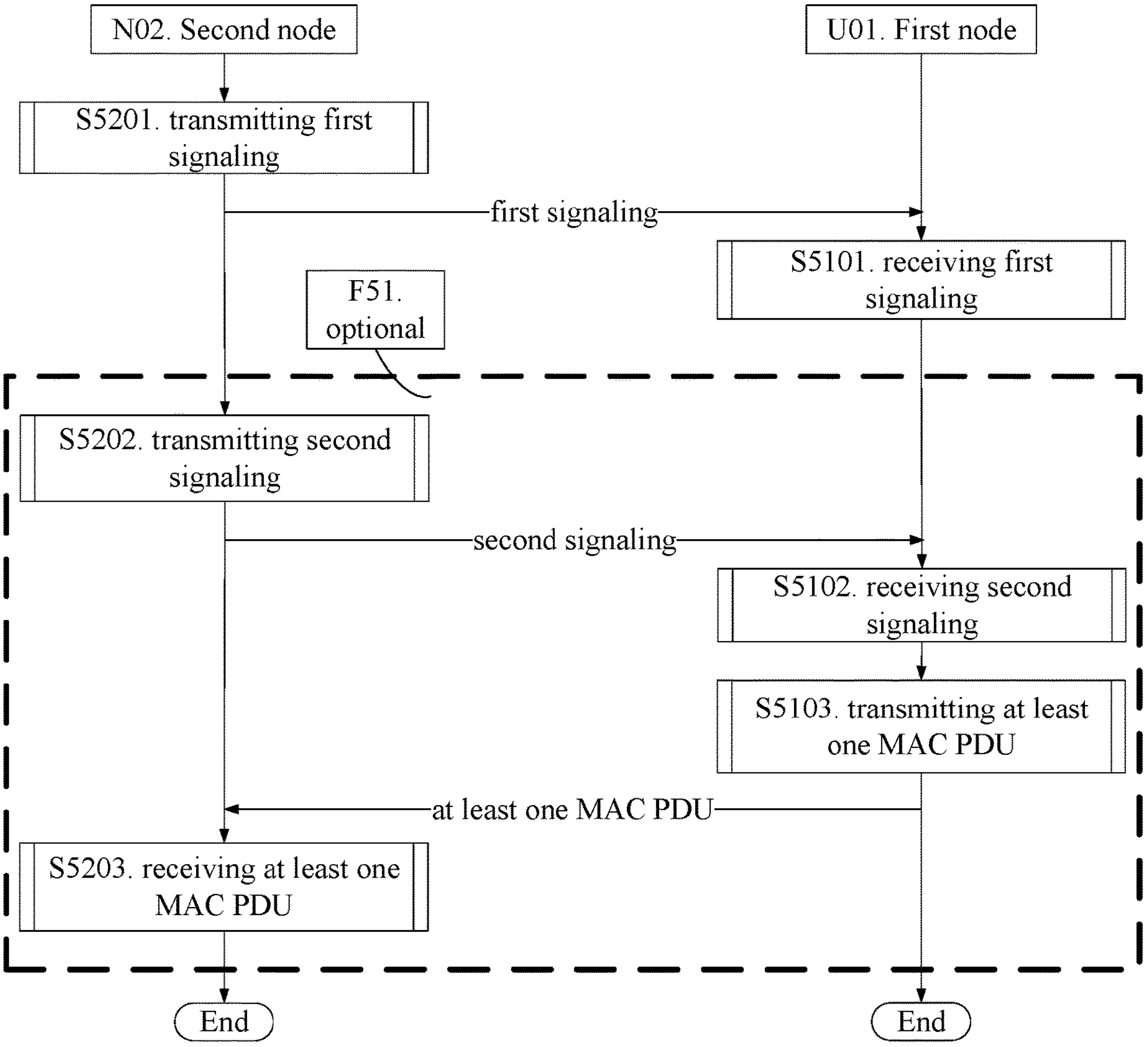
FIG. 5 illustrates a flowchart of radio signal transmission according to one embodiment of the present application.

Embodiment 5 illustrates a flowchart of radio signal transmission according to one embodiment in the present application, as shown in FIG. 5. In FIG. 5, U01 corresponds to a first node in the present application, N02 corresponds to a second node in the present application. It is particularly underlined that the order illustrated in the embodiment does not put constraints over sequences of signal transmissions and implementations and steps in F51 are optional.

The first node U01 receives a first signaling in step S5101; receives a second signaling in step S5102; transmits at least one MAC PDU in step S5103.

The second node N02 transmits a first signaling in step S5201; transmits a second signaling in step S5202; receives at least one MAC PDU in step S5203.

In embodiment 5, the first signaling indicates a first uplink grant; both the first PDU and the second PDU are PDUs of RLC layer; the second PDU later than the first PDU available for a transmission of MAC layer; and the meaning of the phrase of preferentially transmitting a latter of a first PDU and a second PDU comprises: in an initial transmission of the first PDU and an initial transmission of the second PDU, prioritizing the initial transmission of the second PDU; the first PDU and the second PDU use a same logical channel.

In one embodiment, the first node U01 is a UE.

In one embodiment, the second node N02 is a network.

In one embodiment, the second node N02 is a base station.

In one embodiment, the second node N02 is a satellite.

In one embodiment, the second node N02 is a serving cell of the first node U01.

In one embodiment, the second node N02 is a cell group of the first node U01.

In one embodiment, the second node N02 is a PCell of the first node U01.

In one embodiment, the second node N02 is an MCG of the first node U01.

In one embodiment, the second node N02 is an SpCell of the first node U01.

In one embodiment, an interface that the second node N02 is in communications with the first node U01 comprises Uu.

In one embodiment, a latter of the first PDU and the second PDU on resources of the first uplink grant indicated by the first signaling is preferentially transmitted.

In one embodiment, an interface between the first node U01 and the second node N02 is a Uu interface.

In one embodiment, the first signaling is transmitted earlier than the second signaling.

In one embodiment, the protocol layer generating the first signaling is higher than the protocol layer generating the second signaling.

In one embodiment, the second signaling comprises a configuration index indicated by the first signaling.

In one embodiment, the second signaling indicates the first uplink grant.

In one embodiment, the second signaling indicates resources of the first uplink grant.

In one embodiment, the second signaling activates the first uplink grant.

In one embodiment, the second signaling is a physical-layer signaling.

In one embodiment, the second signaling is a DCI.

In one embodiment, when the first uplink grant is a CG, the second signaling is only used to activate the first uplink grant.

In one embodiment, when the first uplink grant is dynamically scheduled, the second signaling is a DCI, which is used to indicate the first uplink grant.

In one subembodiment of the embodiment, the first signaling is used to indicate that the first uplink grant is applicable to the first-type PDU.

In one subembodiment of the embodiment, the first signaling is used to indicate that the first uplink grant is applicable to the first PDU.

In one subembodiment of the embodiment, the first signaling is used to indicate that the first uplink grant is applicable to the second PDU.

In one embodiment, when the first uplink grant is dynamically scheduled, and the first signaling is a DCI, the first signaling is used to indicate the first uplink grant.

In one subembodiment of the embodiment, the second signaling is not used in this case.

In one embodiment, before transmitting the at least one MAC PDU, the first node U01 selects at least first logical channel for the first uplink grant; allocates resources for data of each logical channel in the at least first logical channel.

In one embodiment, the at least one MAC PDU comprises the data of each logical channel in the at least first logical channel.

In one embodiment, the behavior of selecting at least first logical channel for the first uplink grant comprises: whether a logical channel is selected depends on whether data available for transmission of the logical channel comprises a first-type PDU; multiple the first-type PDUs carry one unit of information generated at the application level.

In one embodiment, the first signaling is used to determine that the first uplink grant is applicable to a first-type PDU.

In one embodiment, the first logical channel is used to bear the first PDU and the second PDU.

In one embodiment, the meaning of the phrase of selecting at least first logical channel for the first uplink grant comprises: selecting at least first logical channel for or according to the first uplink grant.

In one embodiment, the meaning of the phrase of selecting at least first logical channel for the first uplink grant comprises: for transmitting data on the first uplink grant, selecting at least first logical channel.

In one embodiment, the meaning of the phrase of selecting at least first logical channel for the first uplink grant comprises: a reception of transmitted data on the first uplink grant triggering a selection of at least first logical channel.

In one embodiment, the at least first logical channel comprises or only comprises all logical channels allocated with resources.

In one subembodiment of the above embodiment, the resources in the phrase of being allocated with resources belong to resources indicated by or comprised in the first uplink grant.

In one embodiment, the at least first logical channel comprises or only comprises all logical channels allocated with resources indicated by or comprised in the first uplink grant.

In one embodiment, the phrase of allocating resources to data of each logical channel in the at least first logical channel comprises: allocating resources for the at least first logical channel.

In one embodiment, the meaning of the phrase of allocating resources to data of each logical channel in the at least first logical channel comprises: on resources of the first uplink grant, transmitting data of the selected at least one logical channel.

In one embodiment, the meaning of the phrase of allocating resources to data of each logical channel in the at least first logical channel comprises: allocating resources to data of each logical channel in the at least first logical channel according to a predetermined data rate.

In one embodiment, the meaning of the phrase of allocating resources to data of each logical channel in the at least first logical channel comprises: allocating resources to data of each logical channel in the at least first logical channel according to an order of priority.

In one embodiment, the meaning of the phrase of allocating resources to data of each logical channel in the at least first logical channel comprises: allocating resources to data of each logical channel in the at least first logical channel with priority as weight.

In one embodiment, the meaning of the phrase of allocating resources to data of each logical channel in the at least first logical channel comprises: allocating resources to data of each logical channel in the at least first logical channel with a volume of data available for transmission as weight.

In one embodiment, the meaning of the phrase of allocating resources to data of each logical channel in the at least first logical channel comprises: evenly allocating resources to data of each logical channel in the at least first logical channel.

In one embodiment, the phrase of at least first logical channel only comprises the first logical channel.

In one embodiment, the phrase of at least first logical channel comprises the first logical channel and a logical channel other than the first logical channel.

In one embodiment, the first PDU and the second PDU are respectively associated with a same radio bearer.

In one embodiment, the first PDU and the second PDU are respectively associated with a same QoS flow or QoS sub-flow.

In one embodiment, the phrase of transmitting at least one MAC PDU comprises only transmitting a MAC PDU.

In one embodiment, the phrase of transmitting at least one MAC PDU comprises transmitting multiple MAC PDUs.

In one embodiment, the meaning of the phrase of transmitting at least one MAC PDU comprises: determining how many MAC PDUs to be transmitted based on a volume of data available for transmission.

In one embodiment, the meaning of the phrase of transmitting at least one MAC PDU comprises: determining how many MAC PDUs to be transmitted based on the at least first logical channel comprises how many logical channels; herein, a number of transmitted MAC PDU(s) is equal to a number of logical channel(s) comprised in the at least first logical channel.

In one embodiment, data of at least partial logical channel in the at least first logical channel can be multiplexed in a MAC PDU.

In one embodiment, the meaning of the phrase of transmitting at least one MAC PDU comprises: the first node determines how many MAC PDUs to be transmitted based on network configuration.

In one embodiment, the meaning of the phrase of transmitting at least one MAC PDU comprises: the first node determines how many MAC PDUs to be transmitted based on internal algorithms.

In one embodiment, the meaning of the phrase of transmitting at least one MAC PDU comprises: the first node determines how many MAC PDUs to be transmitted based on the first signaling.

In one embodiment, the meaning of the phrase of whether a logical channel is selected depends on whether data available for transmission of the logical channel comprises the first-type PDU comprises: whether a logical channel is selected can also depend on other parameters.

In one embodiment, the meaning of the phrase of whether a logical channel is selected depends on whether data available for transmission of the logical channel comprises the first-type PDU comprises: under the condition that other parameters are the same, if data available for transmission of a logical channel comprises the first-type PDU, then the data of this logical channel is preferentially transmitted.

In one embodiment, resources allocated by the first uplink grant can accept at least partial data of a logical channel whose data available for transmission comprises the first-type PDU.

In one embodiment, the meaning of the phrase of whether a logical channel is selected depends on whether data available for transmission of the logical channel comprises the first-type PDU comprises: under the condition that other parameters are the same, if data available for transmission of a logical channel comprises the first-type PDU, then the logical channel is selected.

In one embodiment, the meaning of the phrase of whether a logical channel is selected depends on whether data available for transmission of the logical channel comprises the first-type PDU comprises: under the condition that other parameters are the same, a logical channel whose data available for transmission comprises the first-type PDU is preferentially selected over a logical channel whose data available for transmission does not comprise the first-type PDU.

In one embodiment, the meaning of the phrase of whether a logical channel is selected depends on whether data available for transmission of the logical channel comprises the first-type PDU comprises: under the condition that other parameters are the same, data available for transmission of a selected logical channel comprises the first-type PDU.

In one embodiment, the meaning of the phrase of whether a logical channel is selected depends on whether data available for transmission of the logical channel comprises the first-type PDU comprises: under the condition that other parameters are the same, only when a logical channel whose data available for transmission comprises the first-type PDU is selected, a logical channel whose data available for transmission does not comprise the first-type PDU can be selected.

In one embodiment, resources allocated by the first uplink grant can accept at least partial data of a logical channel whose data available for transmission comprises the first-type PDU.

In one embodiment, a delay budget of the first-type PDU comprised in data available for transmission of the selected logical channel has not yet been exhausted or is about to be exhausted.

In one embodiment, the other parameters comprise priority.

In one embodiment, the other parameters comprise Bj.

In one embodiment, the other parameters comprise a size of a bucket, and the size of the bucket is used to calculate Bj.

In one embodiment, the other parameters comprise delay requirements.

In one embodiment, the other parameters comprise delay budget or remaining processing time.

In one embodiment, the other parameters comprise Pj.

In one embodiment, the other parameters comprise a data volume requires to be preferentially transmitted.

In one embodiment, the other parameters comprise a type of data available for transmission.

In one embodiment, the other parameters comprise a type of logical channel.

In one embodiment, the other parameters comprise a number of first-type PDU(s).

In one embodiment, the other parameters comprise a number of first-type PDU(s) available for transmission.

In one embodiment, the other parameters comprise a number of first-type PDU(s) already transmitted.

In one embodiment, the other parameters comprise whether data available for transmission comprises other PDU sets.

In one embodiment, the other parameters comprise that data available for transmission does not comprise other PDU sets.

In one embodiment, the other parameters comprise data available for transmission and do not comprise other PDU sets with tighter delay budgets.

In one embodiment, the meaning of being preferentially transmitted comprises: when resources indicated by an uplink grant are insufficient to accommodate all data available for transmission, the preferentially transmitted data is firstly allocated resources or preferentially allocated resources.

In one embodiment, the meaning of being preferentially transmitted comprises: when resources indicated by an uplink grant are insufficient to accommodate all data available for transmission, only after resources are allocated to the preferentially transmitted data, then resources are allocated to data not preferentially transmitted.

In one embodiment, the meaning of being preferentially transmitted comprises: when resources indicated by an uplink grant are insufficient to accommodate all data available for transmission, only after the preferentially transmitted data is transmitted, data not preferentially transmitted is then transmitted.

In one embodiment, the meaning of being preferentially transmitted comprises: as long as there is an uplink grant, at least partial data in preferentially transmitted data is transmitted.

In one subembodiment of the above embodiment, the uplink grant can accommodate at least volume of data allowed to be transmitted.

In one embodiment, the behavior of, selecting at least first logical channel for the first uplink grant, comprises: whether a logical channel is selected depends on a priority of the logical channel.

In one embodiment, a priority of a logical channel is network-configured.

In one embodiment, a priority of a logical channel is configured or indicated by the first signaling.

In one embodiment, a priority of a logical channel is indicated by a DCI.

In one embodiment, a priority of a logical channel is determined by a priority of a logical channel group.

In one embodiment, the higher a priority value of a logical channel, the lower a priority.

In one embodiment, the phrase of the behavior of, selecting at least first logical channel for the first uplink grant, comprises: the meaning of whether a logical channel is selected depends on a priority of the logical channel comprises: under the condition that parameters other than a priority of a logical channel are the same, data available for transmission of a logical channel with higher priority is preferentially transmitted.

In one embodiment, the behavior of, allocating resources to data of each logical channel in the at least first logical channel, comprises: resources allocated to a target logical channel in the at least first logical channel depend on a number of the first-type PDU(s) in data available for transmission of the target logical channel.

In one embodiment, the behavior of, allocating resources to data of each logical channel in the at least first logical channel, comprises: resources allocated to a target logical channel in the at least first logical channel depend on a number of the first-type PDU(s) in data available for transmission of the target logical channel.

In one embodiment, the phrase of the behavior of, allocating resources to data of each logical channel in the at least first logical channel, comprises: the meaning of resources allocated to a target logical channel in the at least first logical channel depending on a number of the first-type PDU(s) in data available for transmission of the target logical channel comprises: MAC allocates resources based on a number of first-type PDU(s) in data available for transmission of the target logical channel.

In one embodiment, the phrase of the behavior of, allocating resources to data of each logical channel in the at least first logical channel, comprises: the meaning of resources allocated to a target logical channel in the at least first logical channel depending on a number of the first-type PDU(s) in data available for transmission by the target logical channel comprises: when MAC allocates resources for the target logical channel, it first satisfies a transmission of the first-type PDU in data available for transmission.

In one embodiment, the phrase of the behavior of, allocating resources to data of each logical channel in the at least first logical channel, comprises: the meaning of resources allocated to a target logical channel in the at least first logical channel depending on a number of the first-type PDU(s) in data available for transmission of the target logical channel comprises: under the condition that all parameters other than a number of the first-type PDU(s) of data available for transmission are the same, the more a number of the first-type PDU(s) in data available for transmission of the target logical channel, the more resources are allocated.

In one embodiment, the behavior of, selecting at least first logical channel for the first uplink grant, comprises: whether a logical channel is selected depends on a number of the first-type PDU(s) in data available for transmission of the logical channel.

In one subembodiment of the above embodiment, the first-type PDU corresponds to a PDU set.

In one subembodiment of the above embodiment, under the condition that all parameters other than a number of the first-type PDU(s) in data available for transmission are the same, data of a logical channel with a larger number of the first-type PDU(s) in data available for transmission is preferentially transmitted.

In one subembodiment of the above embodiment, under the condition that all parameters other than a number of the first-type PDU(s) in data available for transmission are the same, data of a logical channel with a smaller number of the first-type PDU(s) in data available for transmission is preferentially transmitted.

In one embodiment, the behavior of, selecting at least first logical channel for the first uplink grant, comprises: whether a logical channel is selected depends on a number of the first-type PDU(s) in already transmitted data of the logical channel.

In one subembodiment of the above embodiment, the first-type PDU corresponds to a PDU set.

In one subembodiment of the above embodiment, under the condition that all parameters other than a number of the first-type PDU(s) in already transmitted data are the same, data of a logical channel with a larger number of the first-type PDU(s) in already transmitted data is preferentially transmitted.

In one subembodiment of the above embodiment, under the condition that all parameters other than a number of the first-type PDU(s) in already transmitted data are the same, data of a logical channel with a smaller number of the first-type PDU(s) in already transmitted data is preferentially transmitted.

In one embodiment, the behavior of, selecting at least first logical channel for the first uplink grant, comprises: whether a logical channel is selected depends on a number of the first-type PDU(s) in data available for transmission and already transmitted data of the logical channel.

In one subembodiment of the above embodiment, the first-type PDU corresponds to a PDU set.

In one subembodiment of the above embodiment, under the condition that parameters other than a size of a number of the first-type PDU(s) in data available for transmission and already transmitted data are the same, data of a logical channel with a larger number of the first-type PDU(s) in data available for transmission and already transmitted data is preferentially transmitted.

In one subembodiment of the above embodiment, under the condition that parameters other than a size of a number of the first-type PDU(s) in data available for transmission and already transmitted data are the same, data of a logical channel with a smaller number of the first-type PDU(s) in data available for transmission and already transmitted data is preferentially transmitted.

In one subembodiment of the above embodiment, under the condition that parameters other than a size of a number of the first-type PDU(s) in data available for transmission and already transmitted data are the same, data of a logical channel with a smaller ratio of a number of the first-type PDU(s) in data available for transmission to a number of the first-type PDU(s) in already transmitted data is preferentially transmitted.

In one subembodiment of the above embodiment, under the condition that parameters other than a size of a number of the first-type PDU(s) in data available for transmission and already transmitted data are the same, data of a logical channel with a greater ratio of a number of the first-type PDU(s) in data available for transmission to a number of the first-type PDU(s) in already transmitted data is preferentially transmitted.

In one subembodiment of the above embodiment, under the condition that parameters other than a size of a number of the first-type PDU(s) in data available for transmission and already transmitted data are the same, data of a logical channel with a smaller ratio of a number of the first-type PDU(s) in data available for transmission to a sum of a number of the first-type PDU(s) in data available for transmission and a number of the first-type PDU(s) in already transmitted data is preferentially transmitted.

In one subembodiment of the above embodiment, under the condition that parameters other than a size of a number of the first-type PDU(s) in data available for transmission and already transmitted data are the same, data of a logical channel with a greater ratio of a number of the first-type PDU(s) in data available for transmission to a sum of a number of the first-type PDU(s) in data available for transmission and a number of the first-type PDU(s) in already transmitted data is preferentially transmitted.

In one embodiment, the meaning of the phrase of a number of the first-type PDU(s) in data available for transmission and already transmitted data is a number of the first-type PDU(s) in data available for transmission and a number of the first-type PDU(s) in already transmitted data.

In one embodiment, the meaning of the phrase of a number of the first-type PDU(s) is or comprises: a number of the first-type PDU(s).

In one embodiment, the meaning of the phrase of a number of the first-type PDU(s) is or comprises: a data volume of the first-type PDU.

In one embodiment, the meaning of the phrase of a number of the first-type PDU(s) is or comprises: a total number of bit(s) of the first-type PDU.

In one embodiment, the meaning of the phrase of a number of the first-type PDU(s) is or comprises: a data volume of the first-type PDU.

In one embodiment, the behavior of, selecting at least first logical channel for the first uplink grant, comprises: whether a logical channel is selected depends on a delay budget of the first-type PDU in data available for transmission of the logical channel.

In one embodiment, under the condition that parameters other than a delay budget of the first-type PDU in data available for transmission are the same, data of a logical channel whose first-type PDU in data available for transmission with a smaller delay budget is preferentially transmitted.

In one embodiment, the behavior of selecting at least first logical channel for the first uplink grant comprises: first selecting a logical channel whose data available for transmission comprises a first-type PDU, then selecting a logical channel whose Bj is greater than 0, and finally selecting a logical channel with a higher priority.

In one embodiment, the behavior of selecting at least first logical channel for the first uplink grant comprises: in a logical channel whose data available for transmission comprises a first-type PDU, data of a logical channel with a higher priority is preferentially transmitted over data of a logical channel with a lower priority; data of a logical channel with a lower priority whose data available for transmission comprises a first-type PDU is prioritized over data of a logical channel with a higher priority whose data available for transmission does not comprise a first-type PDU; data of a logical channel with a higher priority whose data available for transmission comprises a first-type PDU is prioritized over data of a logical channel with a lower priority whose data available for transmission does not comprise a first-type PDU.

In one embodiment, the behavior of selecting at least first logical channel for the first uplink grant comprises: first selecting a logical channel whose data available for transmission comprises a first-type PDU, then selecting a logical channel with a higher priority, and finally selecting a logical channel with greater Bj.

In one embodiment, in logical channels with same priority whose data available for transmission comprises a first-type PDU, data of a logical channel with greater Bj is preferentially transmitted.

In one embodiment, in a logical channel whose data available for transmission comprises a first-type PDU, data of a logical channel with higher priority and greater Bj is preferentially transmitted, and data of a logical channel with a higher priority and smaller Bj is preferentially transmitted.

In one embodiment, data of a logical channel whose pending data comprises a first-type PDU is always preferentially transmitted over data of a logical channel whose data available for transmission does not comprise a first-type PDU.

In one embodiment, the behavior of selecting at least first logical channel for the first uplink grant comprises: first selecting a logical channel with a higher priority, and then selecting a logical channel whose data available for transmission comprises a first-type PDU.

In one subembodiment of the above embodiment, finally, a logical channel with greater Bj is selected.

In one embodiment, the behavior of selecting at least first logical channel for the first uplink grant comprises: data of a logical channel with a higher priority is preferentially transmitted over data of a logical channel with lower priority.

In one embodiment, the behavior of selecting at least first logical channel for the first uplink grant comprises: data of a logical channel whose priority is greater and data available for transmission comprises the first-type PDU is always preferentially transmitted over data of a logical channel whose priority is lower and data available for transmission does not comprise a first-type PDU.

In one embodiment, the behavior of selecting at least first logical channel for the first uplink grant comprises: data of a logical channel whose priority is greater and data available for transmission does not comprise the first-type PDU is always preferentially transmitted over data of a logical channel whose priority is lower and data available for transmission comprises a first-type PDU.

In one embodiment, data of a logical channel whose priority is lower and data available for transmission comprises a first-type PDU is always preferentially transmitted over data of a logical channel whose priority is lower and data available for transmission does not comprise a first-type PDU.

In one embodiment, the meaning of data of a logical channel being preferentially transmitted comprises: the logical channel is preferentially selected for the first uplink grant selection.

In one embodiment, the meaning of data of a logical channel being preferentially transmitted comprises: the logical channel is preferentially allocated resources when resources are allocated to a logical channel.

In one embodiment, the data available for transmission of the target logical channel comprises the first-type PDU; data arriving later in the data available for transmission of the target logical channel is preferentially allocated resources.

In one embodiment, the at least first logical channel comprises multiple logical channels.

In one embodiment, the behavior of allocating resources to data of each logical channel in the at least first logical channel comprises: for all logical channels other than the target logical channel in the at least first logical channel, all data available for transmission is allocated resources.

In one embodiment, the target logical channel is a logical channel with lowest priority in the at least first logical channel.

In one embodiment, the target logical channel is a logical channel in the at least first logical channel whose data available for transmission does not comprise the first-type PDU.

In one embodiment, data available for transmission of more than one logical channel in the at least one logical channel does not comprise the first-type PDU, and the target logical channel is a logical channel with a lowest priority in the more than one logical channel.

In one embodiment, the at least one MAC PDU comprises at least the second PDU.

In one embodiment, the at least one MAC PDU uses resources of the first uplink grant.

Embodiment 6

Figure 6:
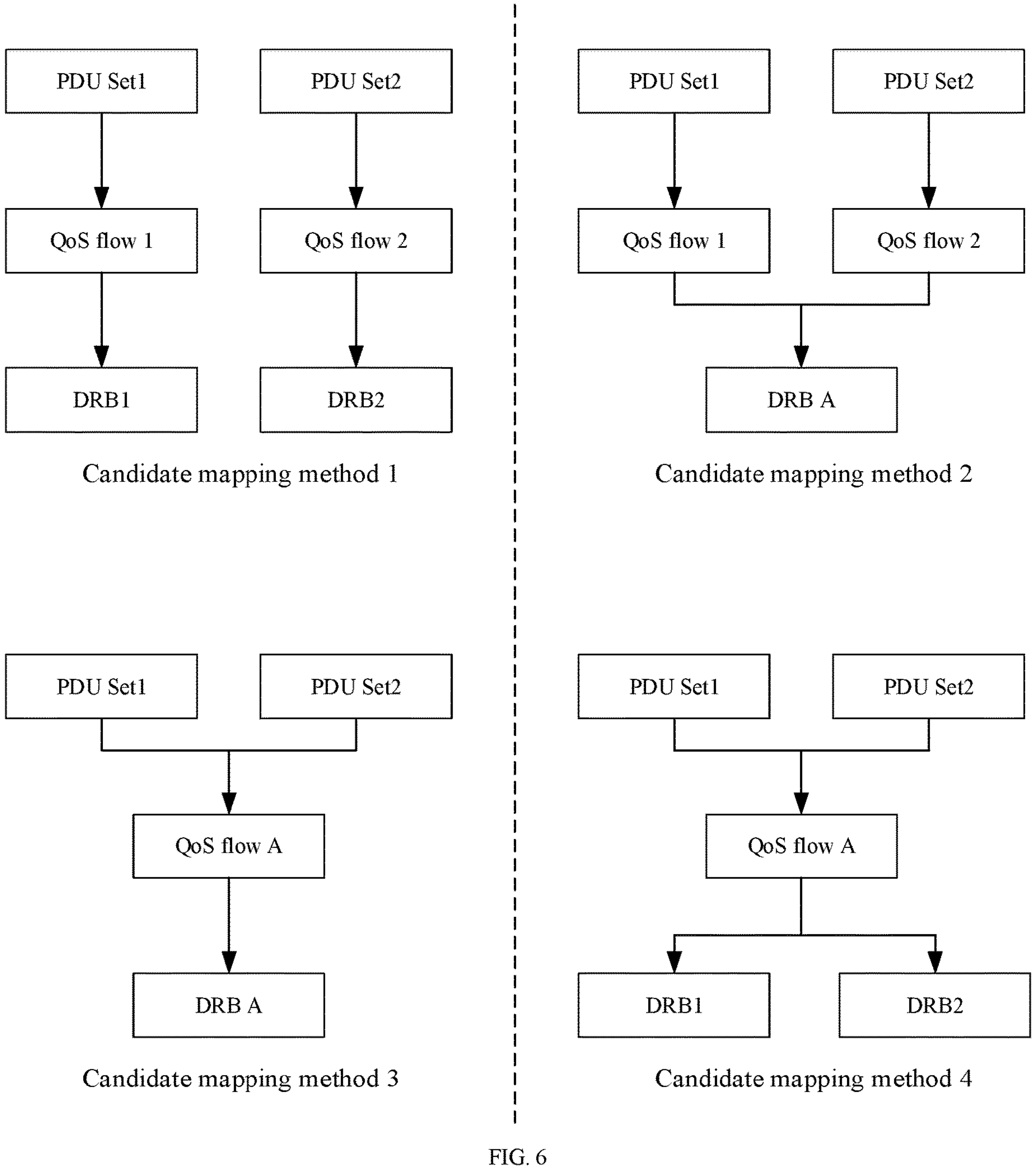
FIG. 6 illustrates a schematic diagram of a candidate mapping method of a PDU set according to one embodiment of the present application.

Embodiment 6 illustrates a schematic diagram of a candidate mapping method of a PDU set according to one embodiment of the present application, as shown in FIG. 6.

In one embodiment, a PDU set comprises one or multiple PDUs, and a PDU comprised in a PDU set carries payload of one unit of information generated at the application level; information generated at the application level comprises a frame or a video slice; in some implementation methods, if the application level uses such a unit of information, all PDUs in a PDU set are required; in other implementation methods, when partial PDUs in a PDU set are lost, the application level can recover partial or all of information from a PDU set.

In one embodiment, the first-type PDU is used for a PDU set.

In one embodiment, the first-type PDU in data available for transmission of a logical channel belongs to or carries a PDU of a same PDU set.

In one embodiment, the meaning of the phrase of whether a logical channel is selected depends on whether data available for transmission of the logical channel comprises the first-type PDU comprises: whether a logical channel is selected depends on whether data available for transmission of the logical channel comprises a PDU of a certain PDU set.

FIG. 6 illustrates four candidate transmission methods of PDU sets.

In mapping method 1 in FIG. 6, PDU set1 is mapped to QoS flow 1; QoS flow 1 is mapped to DRB1; PDU set2 is mapped to QoS flow 2; QoS flow 2 is mapped to DRB2; where DRB1 and DRB2 are respectively a DRB; QoS flow 1 and QoS flow 2 are respectively a QoS flow.

In one embodiment, data of DRB1 and DRB2 are respectively transmitted by different logical channels.

In one embodiment, data of DRB1 and DRB2 are respectively transmitted by a same logical channel.

In one embodiment, data of a DRB1 can be transmitted through one or multiple logical channels.

In one embodiment, data of a DRB2 can be transmitted through one or multiple logical channels.

In one embodiment, data of a DRB1 can be transmitted through the first logical channel.

In one embodiment, data of a DRB1 can be transmitted through the target logical channel.

In one embodiment, data of a DRB2 can be transmitted through the first logical channel.

In one embodiment, data of a DRB2 can be transmitted through the target logical channel.

In one embodiment, a QoS flow is a service interface, a transmission method, or a transmission channel for a transmission of data with a certain QoS between a terminal and the network.

In one subembodiment of the embodiment, the network refers to core network.

In one subembodiment of the embodiment, the network refers to a User Plane Function (UPF) of the core network.

In one embodiment, a DRB is a service interface, a transmission method, or a transmission channel for data transmission between a terminal and an access network.

In mapping method 2 in FIG. 6, PDU set1 is mapped to QoS flow 1; QoS flow 1 is mapped to DRB A; PDU set2 is mapped to QoS flow 2; QoS flow 2 is mapped to the DRB A; where DRB A is a DRB; QoS flow 1 and QoS flow 2 are respectively a QoS flow.

In one embodiment, data of a DRB A can be transmitted through one or multiple logical channels.

In one embodiment, data of a DRB A can be transmitted through the first logical channel.

In one embodiment, data of a DRB A can be transmitted through the target logical channel.

In mapping method 3 in FIG. 6, PDU set1 is mapped to QoS flow A; QoS flow A is mapped to DRB A; PDU set2 is mapped to QoS flow A; where DRB A is a DRB; QoS flow A is a QoS flow.

In mapping method 4 in FIG. 6, PDU set1 is mapped to QoS flow A; QoS flow A is mapped to DRB1 and DRB2; where DRB1 and DRB2 are respectively a DRB; QoS flow A is a QoS flow.

In one embodiment, the first logical channel is used to carry data of DRB1 in candidate mapping method 1.

In one embodiment, the first logical channel is used to carry data of DRB2 in candidate mapping method 1.

In one embodiment, the first logical channel is used to carry data of DRB A in candidate mapping method 2.

In one embodiment, the first logical channel is used to carry data of DRB A in candidate mapping method 3.

In one embodiment, the first logical channel is used to carry data of DRB1 in candidate mapping method 4.

In one embodiment, the first logical channel is used to carry data of DRB2 in candidate mapping method 4.

Embodiment 7

Figure 7:
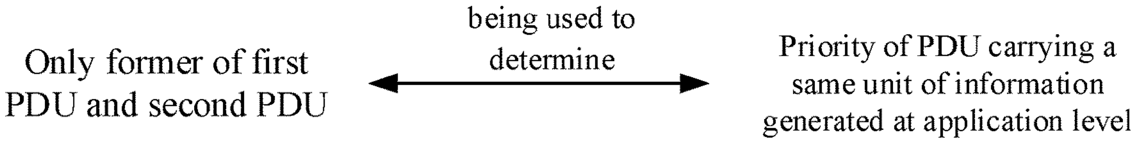
FIG. 7 illustrates a schematic diagram of only a former of a first PDU and a second PDU being used to determine a priority of a PDU carrying a same unit of information generated at the application level according to one embodiment of the present application.

Embodiment 7 illustrates a schematic diagram of only a former of a first PDU and a second PDU being used to determine a priority of a PDU carrying a same unit of information generated at the application level according to one embodiment of the present application, as shown in FIG. 7.

In one embodiment, a PDU carrying a same unit of information generated at the application level belongs to a PDU set.

In one embodiment, a PDU set carries a same unit of information generated at the application level.

In one embodiment, one PDU set has one priority.

In one embodiment, all PDUs in a PDU set have a same priority.

In one embodiment, the priority of a PDU set is determined by the first PDU.

In one embodiment, a priority of the second PDU is determined by the first PDU.

In one embodiment, a priority of a first-type PDU in data available for transmission in a logical channel is determined by an earliest arriving PDU.

In one embodiment, a priority of a first-type PDU in data available for transmission in a logical channel is determined by an earliest PDU that can be used for a MAC transmission.

In one embodiment, the first PDU is an earliest PDU that can be used for a MAC transmission of a first-type PDU in data available for transmission of the first logical channel.

In one embodiment, upon a transmission of the first PDU, a priority of a PDU set to which the first PDU belongs is determined by a PDU other than the first PDU.

In one embodiment, upon a transmission of the first PDU, a priority of a first-type PDU of data available for transmission of the first logical channel is determined by a PDU other than the first PDU.

In one embodiment, when the first PDU is not transmitted, a priority of a first-type PDU of data available for transmission of the first logical channel is determined by the first PDU.

In one embodiment, only when the first PDU is not transmitted, the second PDU is not used to determine a priority of a PDU carrying a same unit of information generated at the application level.

In one embodiment, information carrying a same unit generated at the application level is a PDU set.

In one embodiment, information carrying a same unit generated at the application level is the first-type PDU.

In one embodiment, information carrying a same unit generated at the application level is carried by the first-type PDU.

In one embodiment, information carrying a same unit generated at the application level corresponds to the first-type PDU.

Embodiment 8

Figure 8:
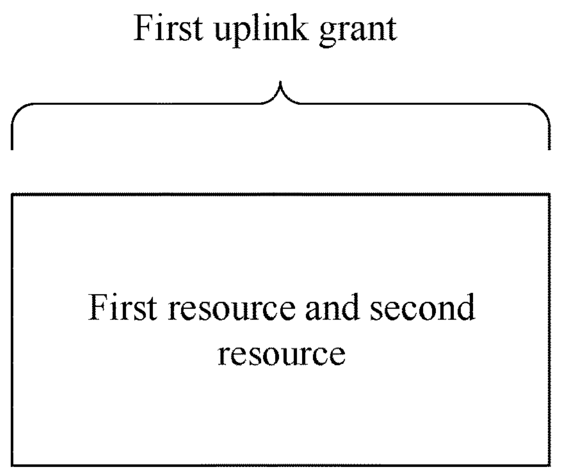
FIG. 8 illustrates a schematic diagram of a first uplink grant according to one embodiment of the present application.

Embodiment 8 illustrates a schematic diagram of a first uplink grant according to one embodiment of the present application, as shown in FIG. 8.

In one embodiment, the first uplink grant comprises a first resource and a second resource, and the first resource and the second resource are orthogonal.

In one embodiment, the first resource and the second resource respectively comprise a part of resources of the first uplink grant.

In one embodiment, the first signaling indicates a proportional relation between the first resource and the second resource.

In one embodiment, the first signaling indicates a proportional relation of the first resource in the first uplink grant.

In one embodiment, the first signaling indicates a proportional relation of the second resource in the first uplink grant.

In one embodiment, the second signaling indicates a proportional relation between the first resource and the second resource.

In one embodiment, the second signaling indicates a proportional relation of the first resource in the first uplink grant.

In one embodiment, the second signaling indicates a proportional relation of the second resource in the first uplink grant.

In one embodiment, the first resource is used for a transmission of the first-type PDU.

In one embodiment, the second resource is used for a transmission of data other than the first-type PDU.

In one embodiment, the first resource is only used for a transmission of the first-type PDU.

In one embodiment, on the second resource, when all the pending transmitted first-type PDUs are transmitted, resources in the second resource can be used for a transmission of a PDU other than the first-type PDU.

In one embodiment, on the first resource, the first-type PDU is preferentially transmitted relative to data other than the first-type PDU.

In one embodiment, on the second resource, the first-type PDU is not preferentially transmitted relative to data other than the first-type PDU.

In one embodiment, on the first resource, the behavior of allocating resources to data of each logical channel in the at least first logical channel is executed according to Bj of each logical channel.

In one embodiment, on the second resource, the behavior of allocating resources to data of each logical channel in the at least first logical channel is executed according to Pj of each logical channel.

In one embodiment, on the second resource, the behavior of allocating resources to data of each logical channel in the at least first logical channel is executed according to a data volume of a pending transmitted first-type PDU of each logical channel.

In one embodiment, on the second resource, the behavior of allocating resources to data of each logical channel in the at least first logical channel is executed according to a priority of each PDU in a pending transmitted first-type PDU of each logical channel.

In one embodiment, on the second resource, the behavior of allocating resources to data of each logical channel in the at least first logical channel is unrelated to Bj of each logical channel.

In one embodiment, on the first resource, the behavior of allocating resources to data of each logical channel in the at least first logical channel is unrelated to Bj of each logical channel.

In one embodiment, on the second resource, the behavior of allocating resources to data of each logical channel in the at least first logical channel is executed according to a delay budget of a pending transmitted first-type PDU of each logical channel.

In one embodiment, the first resource and the second resource are time-division.

In one embodiment, the first resource and the second resource are frequency-division.

In one embodiment, the first resource and the second resource are respectively transmission capability or capacity.

In one embodiment, data transmitted on the first resource uses a Hybrid Automatic Repeat reQuest (HARQ) process different from data transmitted on the second resource.

In one embodiment, the meaning of the phrase of preferentially transmitting a latter of a first PDU and a second PDU on resources of the first uplink grant indicated by the first signaling comprises: preferentially transmitting a latter of the first PDU and the second PDU on the first resource of the first uplink grant.

In one embodiment, the meaning of the phrase of preferentially transmitting a latter of a first PDU and a second PDU on resources of the first uplink grant indicated by the first signaling comprises: preferentially transmitting a latter of the first PDU and the second PDU on the second resource of the first uplink grant.

In one embodiment, the meaning of the phrase of preferentially transmitting a latter of the first PDU and the second PDU on resources of the first uplink grant indicated by the first signaling comprises: not preferentially transmitting a latter of the first PDU and the second PDU on the second resource of the first uplink grant.

In one embodiment, the meaning of the phrase of preferentially transmitting a latter of a first PDU and a second PDU on resources of the first uplink grant indicated by the first signaling comprises: priorities that the first PDU and the second PDU are transmitted on the second resource of the first uplink are the same.

Embodiment 9

Figure 9:
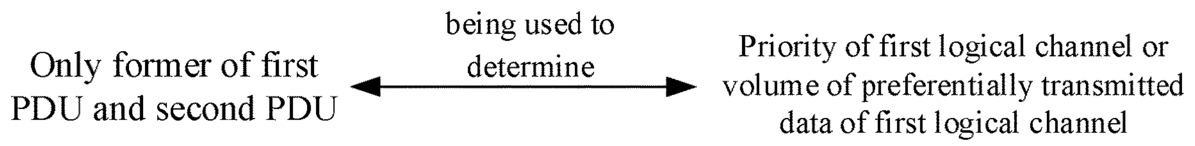
FIG. 9 illustrates a schematic diagram of only a former of a first PDU and a second PDU being used to determine a priority of a first logical channel or a volume of preferentially transmitted data of a first logical channel according to one embodiment of the present application.

Embodiment 9 illustrates a schematic diagram of only a former of a first PDU and a second PDU being used to determine a priority of a first logical channel or a volume of preferentially transmitted data of a first logical channel according to one embodiment of the present application, as shown in FIG. 9.

In one embodiment, when the first PDU is not transmitted, the second PDU is not used to determine a priority of the first logical channel.

In one embodiment, when the first PDU is not transmitted, the second PDU is not used to determine a volume of preferentially transmitted data of the first logical channel.

In one embodiment, the volume of preferentially transmitted data is that the first PDU can at least be transmitted after a volume of preferentially transmitted data of the second PDU is transmitted.

In one subembodiment of the above embodiment, a size of the second PDU is not less than a volume of preferentially transmitted data of the second PDU.

In one embodiment, a priority of at least the first PDU in the first PDU and the second PDU is greater than a PDU other than the first PDU and the second PDU in data available for transmission of the first logical channel.

In one embodiment, a size of the first PDU is used to determine a volume of preferentially transmitted data of the first logical channel.

In one embodiment, a priority of the first PDU is used to determine a priority of the first logical channel.

In one embodiment, a delay budget of the first PDU is used to determine a priority of the first logical channel.

In one embodiment, a chronological order that the first PDU is transmitted at MAC layer is used to determine a priority of the first logical channel.

In one embodiment, a remaining processing time of the first PDU is used to determine a priority of the first logical channel.

Embodiment 10

Figure 10:
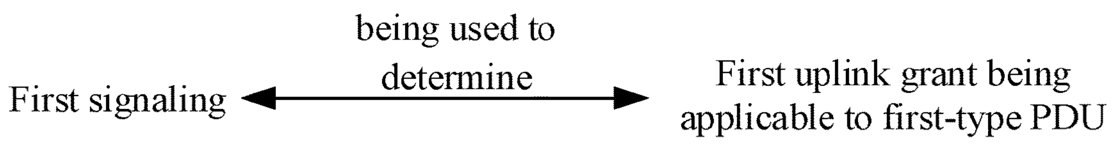
FIG. 10 illustrates a schematic diagram of a first signaling being used to determine that a first uplink grant is applicable to a first-type PDU according to one embodiment of the present application.

Embodiment 10 illustrates a schematic diagram of a first signaling being used to determine that a first uplink grant is applicable to a first-type PDU according to one embodiment of the present application, as shown in FIG. 10.

In one embodiment, the first signaling indicates a first time window, and an uplink grant within a first time window is applicable to the first-type PDU.

In one subembodiment of the embodiment, the first uplink grant is within the first time window.

In one embodiment, the first signaling indicates a first frequency-domain resource, and a part of an uplink grant belonging to the first frequency-domain resource is applicable to the first-type PDU.

In one subembodiment of the embodiment, the first uplink grant is within the first frequency-domain resource.

In one embodiment, the first signaling indicates a configuration index list for uplink grant, and an uplink grant corresponding to the configuration index list is applicable to the first-type PDU.

In one subembodiment of the embodiment, a configuration index of the first uplink grant belongs to the configuration index list.

In one embodiment, the first signaling explicitly indicates that the first uplink grant is applicable to the first-type PDU.

In one embodiment, the first signaling indicates parameters of an uplink grant used by the first-type PDU, and the parameters comprise an applicable PDU.

In one subembodiment of the embodiment, the used PDU comprises the first-type PDU.

In one embodiment, the first signaling indicates a logical channel to which the first uplink grant is applicable.

In one subembodiment of the above embodiment, the applicable logical channel is used for transmission or is only used for transmission of the first-type PDU.

In one embodiment, data available for transmission for the first logical channel only comprises the first-type PDU.

In one embodiment, data available for transmission of the first logical channel comprises the first-type PDU and data other than the first-type PDU.

In one embodiment, the first-type PDU is a PDU of emergency services.

In one embodiment, the first-type PDU is a PDU of real-time services.

In one embodiment, the first-type PDU is a PDU of XR services.

In one embodiment, the first-type PDU is a PDU that bears information related to actions and/or gestures.

In one embodiment, the first-type PDU is or carries information related to safety.

In one embodiment, the first-type PDU is or carries information related to artificial intelligence.

In one embodiment, the first-type PDU is or carries information related to positioning.

In one embodiment, the first-type PDU is or carries information related to fingerprint database.

In one embodiment, the first-type PDU is or carries fingerprint database information related to artificial intelligence.

In one embodiment, the first-type PDU is a MAC SDU for MAC layer or MAC sublayer.

In one embodiment, the first-type PDU is generated by physical layer.

In one embodiment, the first-type PDU is information related to measurement.

In one subembodiment of the above embodiment, the first-type PDU is transmitted through a MAC layer.

In one embodiment, the first-type PDU is not a MAC sublayer signaling.

In one embodiment, the first-type PDU is not an RLC sublayer signaling.

In one embodiment, the first-type PDU is not a PDCP sublayer signaling.

In one embodiment, the first-type PDU is not an RRC signaling.

In one embodiment, the first-type PDU uses SRB4.

In one embodiment, the first-type PDU uses SRB5.

In one embodiment, the first-type PDU uses SRB6.

In one embodiment, the first-type PDU uses SRB7.

In one embodiment, the first-type PDU uses SRB8.

In one embodiment, the meaning of the phrase of being applicable to a first-type PDU comprises: the first-type PDU can use resources of the first uplink grant.

In one embodiment, the meaning of the phrase of being applicable to a first-type PDU comprises: only the first-type PDU can use resources of the first uplink grant.

In one embodiment, the meaning of the phrase of being applicable to a first-type PDU comprises: a logical channel whose data available for transmission comprises the first-type PDU can be selected to be transmitted through resources of the first uplink grant.

In one embodiment, the meaning of the phrase of being applicable to a first-type PDU comprises: resources of the first uplink grant can only be allocated to the first-type PDU.

In one embodiment, the meaning of the phrase of being applicable to a first-type PDU comprises: resources of the first uplink grant can only be assigned to a PDU other than the first-type PDU after a transmission of the first-type PDU is completed.

In one embodiment, the meaning of the phrase of being applicable to a first-type PDU comprises: on resources of the first uplink grant, the first-type PDU is preferentially transmitted.

In one embodiment, the meaning of the phrase of being applicable to a first-type PDU comprises: the first uplink grant can meet requirements of the first-type PDU.

In one embodiment, the meaning of the phrase of being applicable to a first-type PDU comprises: when the first-type PDU is transmitted on resources of the first uplink grant, not using a HARQ or not feeding a HARQ-ACK back.

In one embodiment, the meaning of the phrase of being applicable to a first-type PDU comprises: when the first-type PDU is transmitted on resources of the first uplink grant, for a transmission, at most feeding n HARQ-ACK signals back, n being a non-negative integer.

In one embodiment, the meaning of the phrase of being applicable to a first-type PDU comprises: when the first-type PDU is transmitted on resources of the first uplink grant, using bunding feedback based on multiple PDUs or multiple transport blocks.

In one subembodiment of the embodiment, the multiple PDUs or multiple transport blocks refers to a PDU set or corresponds to a PDU set.

In one embodiment, the meaning of the phrase of being applicable to a first-type PDU comprises: when the first-type PDU is transmitted on resources of the first uplink grant, not starting a timer used for discontinuous reception related to HARQ round trip time (RTT).

In one embodiment, the meaning of the phrase of being applicable to a first-type PDU comprises: when the first-type PDU is transmitted on resources of the first uplink grant, not starting a timer used for discontinuous reception related to retransmission.

In one embodiment, the meaning of the phrase of being applicable to a first-type PDU comprises: when the first-type PDU is transmitted on resources of the first uplink grant, stopping disabling a timer related to buffer status reporting.

In one embodiment, the meaning of the phrase of being applicable to a first-type PDU comprises: when the first-type PDU is transmitted on resources of the first uplink grant, stopping disabling a timer related to a scheduling request.

In one embodiment, the meaning of the phrase of being applicable to a first-type PDU comprises: when the first-type PDU is transmitted on resources of the first uplink grant, using aggregation or aggregation technology.

In one embodiment, the meaning of being applicable to the first-type PDU comprises being applicable to the first PDU.

In one embodiment, the meaning of being applicable to the first-type PDU comprises being applicable to the second PDU.

In one embodiment, the meaning of being applicable to the first-type PDU comprises being applicable to only a latter of the first PDU and the second PDU.

In one embodiment, the first PDU belongs to a first-type PDU.

In one embodiment, the second PDU belongs to a first-type PDU.

In one embodiment, the first PDU belongs to a second-type PDU.

In one embodiment, a first signaling is used to determine that a first uplink grant is applicable to a second-type PDU.

In one embodiment, the second-type PDU is a PDU set.

In one embodiment, the first-type PDU is different from the second-type PDU.

In one embodiment, the second-type PDU carries one unit of information generated at the application level.

Embodiment 11

Figure 11:
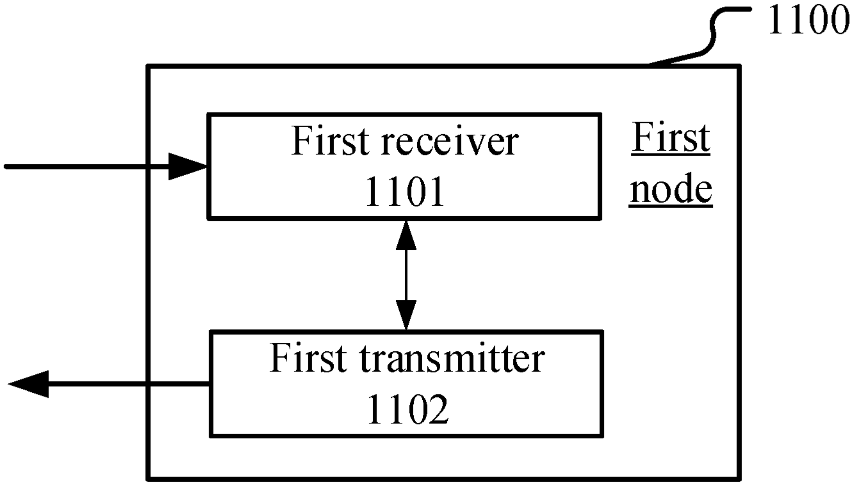
FIG. 11 illustrates a schematic diagram of a processor in a first node according to one embodiment of the present application.

Embodiment 11 illustrates a structure block diagram of a processor in a first node according to one embodiment of the present application, as shown in FIG. 11. In FIG. 11, a processor 1100 in a first node comprises a first receiver 1101 and a first transmitter 1102. In Embodiment 11, the first receiver 1101 receives a first signaling, the first signaling indicates a first uplink grant;

the first transmitter 1102 preferentially transmits a latter of a first PDU and a second PDU on resources of the first uplink grant indicated by the first signaling;

herein, both the first PDU and the second PDU are PDUs of RLC layer; the second PDU later than the first PDU available for a transmission of MAC layer; and the meaning of the phrase of preferentially transmitting a latter of a first PDU and a second PDU comprises: in an initial transmission of the first PDU and an initial transmission of the second PDU, prioritizing the initial transmission of the second PDU; the first PDU and the second PDU use a same logical channel.

In one embodiment, both the first PDU and the second PDU are first-type PDUs, and multiple first-type PDUs carry one unit of information generated at the application level.

In one embodiment, the first-type PDU carries one unit of information generated at the application level; the second PDU carries another unit of information generated at the application level.

In one embodiment, the first PDU and the second PDU are both associated with a first delay budget, and the first delay budget is used to indicate delay requirements; the first PDU and the second PDU are used to carry a same unit of information generated at the application level.

In one embodiment, both the first PDU and the second PDU are used to carry a same unit of information generated at the application level, and only a former of the first PDU and the second PDU is used to determine a priority of a PDU carrying a same unit of information generated at the application level.

In one embodiment, only a former of the first PDU and the second PDU is used to determine a priority of the first logical channel or a volume of preferentially transmitted data of the first logical channel.

In one embodiment, the first transmitter 1102 selects at least first logical channel for the first uplink grant; allocates resources for data of each logical channel in the at least first logical channel; transmits at least one MAC PDU, and the at least one MAC PDU comprises the data of each logical channel in the at least first logical channel;

herein, the behavior of selecting at least first logical channel for the first uplink grant comprises: whether a logical channel is selected depends on whether data available for transmission of the logical channel comprises a first-type PDU; multiple first-type PDUs carry one unit of information generated at the application level; the first signaling is used to determine that the first uplink grant is applicable to a first-type PDU; the first logical channel is used to carry the first PDU and the second PDU.

In one embodiment, the first node is a UE.

In one embodiment, the first node is a terminal that supports large delay differences.

In one embodiment, the first node is a terminal that supports NTN.

In one embodiment, the first node is an aircraft or vessel.

In one embodiment, the first node is a mobile phone or vehicle terminal.

In one embodiment, the first node is a relay UE and/or U2N remote UE.

In one embodiment, the first node is an Internet of Things terminal or an Industrial Internet of Things terminal.

In one embodiment, the first node is a device that supports transmission with low-latency and high-reliability.

In one embodiment, the first node is a sidelink communication node.

In one embodiment, the first receiver 1101 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 1102 comprises at least one of the antenna 452, the transmitter 454, the transmitting processor 468, the multi-antenna transmitting processor 457, the controller/processor 459, the memory 460 or the data source 467 in Embodiment 4.

Embodiment 12

Figure 12:
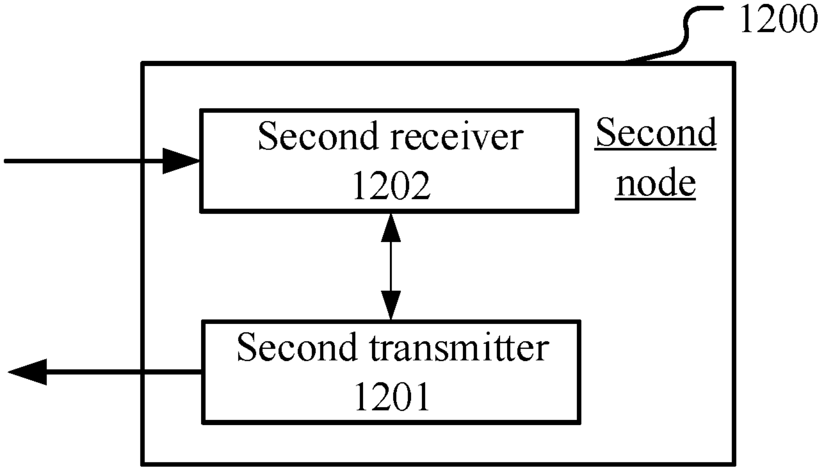
FIG. 12 illustrates a schematic diagram of a processor in a second node according to one embodiment of the present application.

Embodiment 12 illustrates a structure block diagram of a processor in a second node according to one embodiment of the present application, as shown in FIG. 12. In FIG. 12, a processor 1200 in a second node comprises a second receiver 1202 and a second transmitter 1201. In Embodiment 12, the second transmitter 1201 transmits a first signaling, and the first signaling indicates a first uplink grant;

herein, a latter of a first PDU and a second PDU is preferentially transmitted on resources of the first uplink grant indicated by the first signaling; both the first PDU and the second PDU are PDUs of RLC layer; the second PDU later than the first PDU available for a transmission of MAC layer; and the meaning of the phrase that a latter of a first PDU and a second PDU is preferentially transmitted on resources of the first uplink grant indicated by the first signaling comprises: in an initial transmission of the first PDU and an initial transmission of the second PDU, prioritizing the initial transmission of the second PDU; the first PDU and the second PDU use a same logical channel.

In one embodiment, both the first PDU and the second PDU are first-type PDUs, and multiple first-type PDUs carry one unit of information generated at the application level.

In one embodiment, the first-type PDU carries one unit of information generated at the application level; the second PDU carries another unit of information generated at the application level.

In one embodiment, the first PDU and the second PDU are both associated with a first delay budget, and the first delay budget is used to indicate delay requirements; the first PDU and the second PDU are used to carry a same unit of information generated at the application level.

In one embodiment, both the first PDU and the second PDU are used to carry a same unit of information generated at the application level, and only a former of the first PDU and the second PDU is used to determine a priority of a PDU carrying a same unit of information generated at the application level.

In one embodiment, only a former of the first PDU and the second PDU is used to determine a priority of the first logical channel or a volume of preferentially transmitted data of the first logical channel.

In one embodiment, the second receiver 1202 receives at least one MAC PDU, and the at least one MAC PDU comprises data of at least first logical channel; the first logical channel is used to carry the first PDU and the second PDU.

In one embodiment, the second node is a satellite.

In one embodiment, the second node is a base station.

In one embodiment, the second node is a relay.

In one embodiment, the second node is an access point.

In one embodiment, the second node is a node supporting multicast.

In one embodiment, the second transmitter 1201 comprises at least one of the antenna 420, the transmitter 418, the transmitting processor 416, the multi-antenna transmitting processor 471, the controller/processor 475 or the memory 476 in Embodiment 4.

In one embodiment, the second receiver 1202 comprises at least one of the antenna 420, the receiver 418, the receiving processor 470, the multi-antenna receiving processor 472, the controller/processor 475 or the memory 476 in Embodiment 4.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The UE and terminal in the present application include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, satellite communication equipment, vessel communication equipment, NTN UEs, etc. The base station or system device in the present application includes but is not limited to macro-cellular base stations, micro-cellular base stations, home base stations, relay base station, gNB (NR node B), Transmitter Receiver Point (TRP), NTN base stations, satellite equipment, flight platform equipment and other radio communication equipment.

This application can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A user equipment (UE) comprising:

a transceiver; and a processor, wherein the transceiver and the processor are configured to:

receive a signal comprising information indicating an uplink grant, transmit, on resources corresponding to the uplink grant, radio link control (RLC) protocol data units (PDUs), including a first RLC PDU and a second RLC PDU, each associated with the same logical channel, wherein the first RLC PDU is ranked before the second RLC PDU in a cache of a medium access control (MAC) layer, and when initial transmissions of the first RLC PDU and the second RLC PDU are both pending for transmission using the uplink grant, transmit the second RLC PDU before transmitting the first RLC PDU.

2. The UE according to claim 1, wherein the first RLC PDU and the second RLC PDU are PDUs of a same type, and multiple PDUs of the type carry one unit of information generated at an application level.

3. The UE according to claim 2, wherein the first RLC PDU carries one unit of information generated at the application level, and the second RLC PDU carries another unit of information generated at the application level.

4. The UE according to claim 1, wherein the first RLC PDU and the second RLC PDU are each associated with a delay budget that indicates a delay requirement, and the first RLC PDU and the second RLC PDU carry a same unit of information generated at the application level.

5. The UE according to claim 2, wherein the first RLC PDU and the second RLC PDU are each associated with a delay budget that indicates a delay requirement, and the first RLC PDU and the second RLC PDU carry a same unit of information generated at the application level.

6. The UE according to claim 3, wherein the first RLC PDU and the second RLC PDU are each associated with a delay budget that indicates a delay requirement, and the first RLC PDU and the second RLC PDU carry a same unit of information generated at the application level.

7. The UE according to claim 1, wherein the first RLC PDU and the second RLC PDU carry a same unit of information generated at the application level, and only an earlier one of the first RLC PDU and the second RLC PDU is used to determine a priority of a PDU carrying the same unit of information generated at the application level.

8. The UE according to claim 1, wherein the transceiver and the processor are further configured to determine a priority of the logical channel or a volume of data of the logical channel to be transmitted with priority based on only an earlier one of the first RLC PDU and the second RLC PDU.

9. The UE according to claim 1, wherein the transceiver and the processor are further configured to select at least one logical channel for the uplink grant, allocate resources to data of each selected logical channel, and transmit at least one MAC PDU comprising the data of each selected logical channel, wherein the logical channel is selected based on whether data available for transmission of the logical channel comprises a PDU of a type for which multiple PDUs of the type carry one unit of information generated at an application level, and wherein the signal comprises information indicating that the first uplink grant is applicable to PDUs of the type, and wherein the logical channel carries the first RLC PDU and the second RLC PDU.

10. The UE according to claim 2, wherein the transceiver and the processor are further configured to select at least one logical channel for the uplink grant, allocate resources to data of each selected logical channel, and transmit at least one MAC PDU comprising the data of each selected logical channel, wherein the logical channel is selected based on whether data available for transmission of the logical channel comprises a PDU of a type for which multiple PDUs of the type carry one unit of information generated at an application level, and wherein the signal comprises information indicating that the first uplink grant is applicable to PDUs of the type, and wherein the logical channel carries the first RLC PDU and the second RLC PDU.

11. The UE according to claim 3, wherein the transceiver and the processor are further configured to select at least one logical channel for the uplink grant, allocate resources to data of each selected logical channel, and transmit at least one MAC PDU comprising the data of each selected logical channel, wherein the logical channel is selected based on whether data available for transmission of the logical channel comprises a PDU of a type for which multiple PDUs of the type carry one unit of information generated at an application level, and wherein the signal comprises information indicating that the first uplink grant is applicable to PDUs of the type, and wherein the logical channel carries the first RLC PDU and the second RLC PDU.

12. The UE according to claim 1, wherein the first RLC PDU and the second RLC PDU are generated by a same RLC entity.

13. The UE according to claim 1, wherein the first RLC PDU and the second RLC PDU are generated by different RLC entities.

14. The UE according to claim 12, wherein the first RLC PDU and the second RLC PDU are generated by a same packet data convergence protocol (PDCP) entity.

15. The UE according to claim 13, wherein the first RLC PDU and the second RLC PDU are generated by a same packet data convergence protocol (PDCP) entity.

16. The UE according to claim 14, wherein the first RLC PDU and the second RLC PDU belong to different quality of service (QoS) flows.

17. The UE according to claim 15, wherein the first RLC PDU and the second RLC PDU belong to different quality of service (QoS) flows.

18. The UE according to claim 1, wherein a priority of the first RLC PDU is not lower than a priority of the second RLC PDU.

19. A base station comprising:

a transceiver; and a processor, wherein the transceiver and the processor are configured to:

transmit, to a user equipment (UE), a signal comprising information indicating an uplink grant, the uplink grant corresponding to resources for an uplink transmission by the UE, and transmit, in the signal, an indication that the uplink grant is applicable to radio link control (RLC) protocol data units (PDUs) associated with a same logical channel, and an indication that, when initial transmissions of a first radio link control (RLC) protocol data unit (PDU) and a second RLC PDU are both pending for transmission using the uplink grant and the first RLC PDU is ranked before the second RLC PDU in a cache of a medium access control (MAC) layer, the second RLC PDU is to be transmitted before the first RLC PDU.

20. A method, implemented in a user equipment (UE), the method comprising:

receiving a signal comprising information indicating an uplink grant;

transmitting, on resources corresponding to the uplink grant, radio link control (RLC) protocol data units (PDUs), including a first RLC PDU and a second RLC PDU, each associated with the same logical channel, wherein the first RLC PDU is ranked before the second RLC PDU in a cache of a medium access control (MAC) layer; and when initial transmissions of the first RLC PDU and the second RLC PDU are both pending for transmission using the uplink grant, transmitting the second RLC PDU before transmitting the first RLC PDU.

* * * * *